United States Patent
Kim et al.

(10) Patent No.: US 11,955,669 B2
(45) Date of Patent: Apr. 9, 2024

(54) FUEL CELL BIPOLAR PLATE ALLOYS

(71) Applicant: Robert Bosch GmbH, Stuttgart (DE)

(72) Inventors: Soo Kim, Cambridge, MA (US); Jonathan Mailoa, Cambridge, MA (US); Lei Cheng, Sunnvale, CA (US); Nathan Craig, Santa Clara, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/072,235

(22) Filed: Nov. 30, 2022

(65) Prior Publication Data

US 2023/0088316 A1 Mar. 23, 2023

Related U.S. Application Data

(62) Division of application No. 16/694,455, filed on Nov. 25, 2019, now Pat. No. 11,532,827.

(51) Int. Cl.
*H01M 8/0208* (2016.01)
*C22C 9/00* (2006.01)
(Continued)

(52) U.S. Cl.
CPC ............ *H01M 8/0208* (2013.01); *C22C 9/00* (2013.01); *C22C 14/00* (2013.01); *C22C 19/03* (2013.01);
(Continued)

(58) Field of Classification Search
None
See application file for complete search history.

(56) References Cited

U.S. PATENT DOCUMENTS 7,906,219 B2 3/2011 Ohara et al.
9,609,874 B1 4/2017 El-Eskandarany et al.
(Continued)

FOREIGN PATENT DOCUMENTS

CN 106784916 A 5/2017
DE 102008006038 A1 * 7/2009 .......... H01M 8/0206
(Continued)

OTHER PUBLICATIONS

Ward, Logan, et al. "A general-purpose machine learning framework for predicting properties of inorganic materials." npj Computational Materials 2 (2016): 16028.
(Continued)

*Primary Examiner* — Xiaobei Wang
(74) *Attorney, Agent, or Firm* — Brooks Kushman P.C.

(57) ABSTRACT

Fuel cell alloy bipolar plates. The alloys may be used as a coating or bulk material. The alloys and metallic glasses may be particularly suitable for proton-exchange membrane fuel cells because of they may exhibit reduced weights and/or better corrosion resistance. The alloys may include any of the following $Al_xCu_yTi_z$, $Al_xFe_yNi_z$, $Al_xMn_yNi_z$, $Al_xNi_yTi_z$, $Cu_xFe_yTi_z$, $Cu_xNi_yTi_z$, $Al_xFe_ySi_z$, $Al_xMn_ySi_z$, $Al_xNi_ySi_z$, $Ni_xSi_yTi_z$, and $C_xFe_ySi_z$. The alloys or metallic glass may be doped with various dopants to improve glass forming ability, mechanical strength, ductility, electrical or thermal conductivities, hydrophobicity, and/or corrosion resistance.

11 Claims, 3 Drawing Sheets

(51) Int. Cl.
| | |
|---|---|
| C22C 9/01 | (2006.01) |
| C22C 14/00 | (2006.01) |
| C22C 19/03 | (2006.01) |
| C22C 21/00 | (2006.01) |
| C22C 21/12 | (2006.01) |
| C22C 38/02 | (2006.01) |
| H01M 8/021 | (2016.01) |
| H01M 8/0215 | (2016.01) |
| H01M 8/0228 | (2016.01) |
| H01M 8/1004 | (2016.01) |

(52) U.S. Cl.
CPC .............. *C22C 21/00* (2013.01); *C22C 38/02* (2013.01); *H01M 8/021* (2013.01); *H01M 8/0215* (2013.01); *H01M 8/0228* (2013.01); *H01M 8/1004* (2013.01); *C22C 9/01* (2013.01); *C22C 21/12* (2013.01)

(56) References Cited

U.S. PATENT DOCUMENTS

| | | | |
|---|---|---|---|
| 2010/0003536 | A1 | 1/2010 | Smith et al. |
| 2010/0147422 | A1 | 6/2010 | Fleury et al. |
| 2016/0359188 | A1 | 12/2016 | Nakaishi |

FOREIGN PATENT DOCUMENTS

| | | | | |
|---|---|---|---|---|
| JP | 2011249247 | A | 12/2011 | |
| KR | 19990081360 | A | 11/1999 | |
| KR | 20110123561 | A | 11/2011 | |
| KR | 20140097687 | A | 8/2014 | |
| WO | WO-0075389 | A1 * | 12/2000 | ............ C22C 38/004 |
| WO | WO-03044889 | A1 * | 5/2003 | ........... H01M 8/0223 |
| WO | 2019186047 | A1 | 10/2019 | |

OTHER PUBLICATIONS

Tian, Rujin, and Zuoxiang Qin. "Bulk metallic glass Zr55Cu30Al10Ni5 bipolar plates for proton exchange membrane fuel cell." Energy conversion and management 86 (2014): 927-932.

Jayalakshmi, S., et al. "Characteristics of Ni—Nb-based metallic amorphous alloys for hydrogen-related energy applications." Applied energy 90.1 (2012): 94-99.

Yokoyama, Masanori, et al. "Production of metallic glassy bipolar plates for PEM fuel cells by hot pressing in the supercooled liquid state." international journal of hydrogen energy 33.20 (2008): 5678-5685.

Jayaraj, J., A. Gebert, and L. Schultz. "Passivation behaviour of structurally relaxed Zr48Cu36Ag8Al8 metallic glass." Journal of Alloys and Compounds 479.1-2 (2009): 257-261.

Dulnee, Siriwan, et al. "Microstructural Evolution and Mechanical Properties of Ni57Nb33Zr5Co5 Metallic Glass." Materials Research 20 (2017): 244-247.

Thalmaier, Gyorgy, et al. "Corrosion resistance measurements of amorphous Ni40Ti40Nb20 bipolar plate material for polymer electrolyte membrane fuel cells." Advanced Engineering Forum. vol. 8. Trans Tech Publications, 2013.

Kim, Min-Uk, et al. "Surface modification by carbon ion implantation for the application of ni-based amorphous alloys as bipolar plate in proton exchange membrane fuel cells." Metals and Materials International 17.2 (2011): 283-289.

Jayaraj, J., et al. "Corrosion studies on Fe-based amorphous alloys in simulated PEM fuel cell environment." Science and Technology of Advanced Materials 6.3-4 (2005): 282.

Kim, Sung-chul, et al. "Production of Ni65Cr15P16B4 metallic glass-coated bipolar plate for fuel cell by high velocity oxy-fuel (HVOF) spray coating method." Materials transactions 51.9 (2010): 1609-1613.

Rezaei, M. R., S. H. Razavi, and S. G. Shabestari. "Development of a novel Al—Cu—Ti metallic glass reinforced Al matrix composite consolidated through equal channel angular pressing (ECAP)." Journal of Alloys and Compounds 673 (2016): 17-27.

Tavoosi, M., et al. "Amorphous phase formation in Al 80 Fe 10 M 10 (M= Ni, Ti, and V) ternary systems by mechanical alloying." Journal of materials science 46.23 (2011): 7633-7638.

Wei, Xiu, et al. "Fabrication of Al-based bulk metallic glass by mechanical alloying and vacuum hot consolidation." Journal of alloys and compounds 501.1 (2010): 164-167.

Abdulov, A. R., P. G. Agraval, and M. A. Turchanin. "Partial and integral enthalpies of mixing of Cu—Fe—Ti melts at 1873 K." Russian Metallurgy (Metally) 2009.5 (2009): 371-376.

Calin, M., J. Eckert, and L. Schultz. "Improved mechanical behavior of Cu—Ti-based bulk metallic glass by in situ formation of nanoscale precipitates." Scripta Materialia 48.6 (2003): 653-658.

Gargarella, P., et al. "Ti—Cu—Ni shape memory bulk metallic glass composites." Acta Materialia 61.1 (2013): 151-162.

Cheng, Jiangbo, et al. "In-situ synthesis of novel Al—Fe—Si metallic glass coating by arc spraying." Journal of Alloys and Compounds 716 (2017): 88-95.

Dunlap, R. A., et al. "Ferromagnetism in icosahedral Al—Mn—Si alloys." Physical Review B 39.7 (1989): 4808.

McKay, B. J., et al. "Heterogeneous nucleation in an Al—Ni—Si alloy studied using a metallic glass technique." Materials Science and Engineering: A 304 (2001): 240-244.

Yi, S., T. G. Park, and D. H. Kim. "Ni-based bulk amorphous alloys in the Ni—Ti—Zr—(Si, Sn) system." Journal of Materials Research 15.11 (2000): 2425-2430.

Inoue, A., and X. M. Wang. "Bulk amorphous FC20 (Fe—C—Si) alloys with small amounts of B and their crystallized structure and mechanical properties." Acta Materialia 48.6 (2000): 1383-1395.

Do, Jeonghyeon, et al. "Effects of Phosphorus and Carbon Contents on Amorphous Forming Ability in Fe-based Amorphous Alloys Used for Thermal Spray Coatings." Metallurgical and Materials Transactions A 44.6 (2013): 2573-2580.

* cited by examiner

FUEL CELL BIPOLAR PLATE ALLOYS

CROSS-REFERENCE TO RELATED APPLICATION

This application is a divisional of U.S. application Ser. No. 16/694,455 filed Nov. 25, 2019 and issued on Dec. 20, 2022 as U.S. Pat. No. 11,532,827, the disclosure of which is incorporated herein by reference in its entirety.

TECHNICAL FIELD

The present disclosure relates to fuel cell bipolar plate alloys where the alloys may form a bulk material and/or a coating material of the bipolar plate.

BACKGROUND

Fuel cells may be an alternative power source for mobile transportation applications or other applications. Fuel cells may use a renewable energy carrier such as hydrogen. For example, fuel cells may produce electrical power and the byproduct of water from hydrogen ($H_2$) and oxygen ($O_2$). Fuel cells convert chemical energy into electrical energy. Fuel cells may be stacked to form a fuel cell stack having high voltage and/or power. A common fuel cell is a proton-exchange membrane fuel cell (PEMFC). A PEMFC may include bipolar plates, electrodes, a catalyst or catalyst layer, and a proton-exchange membrane. Bipolar plates can contribute significantly to the weight and cost of a fuel cell. The bipolar plates may provide structural support, conductivity, and may assist in supplying fuel to other components of the fuel cell. Bipolar plates may connect and divide individual fuel cells to form a fuel cell stack. Bipolar plates may also assist in removal of reaction products or byproducts. Bipolar plates may help regulate or manage thermal conditions in a fuel cell. Bipolar plates may be made of metallic compositions or graphite. For example, steel may be utilized because it is relatively inexpensive, stable, conductive and durable. However, many steels, including various grades of stainless steel, struggle to maintain performance in the corrosive environment of a fuel cell and are relatively heavy. This degradation may reduce a fuel cell's life or efficiency. Using graphite for bipolar plates has also been investigated. Graphite generally maintains good corrosive-resistant properties but can be expensive and brittle.

SUMMARY

According to at least one embodiment, a bipolar plate of a fuel cell is disclosed. The bipolar plate may include a substrate having first and second surfaces. The first and/or second surface having a surface layer coating. The surface layer coating including an alloy having a formula: $Cu_xFe_yTi_z$, $Cu_xNi_yTi_z$, $Ni_xSi_yTi_z$, $C_xFe_ySi_z$, $Al_xFe_ySi_z$, $Al_xMn_ySi_z$, or $Al_xNi_ySi_z$; where x is present up to 0.885; y is present up to 0.85; z is 0.05 to 0.8; and the sum of x, y, and z is 1.

In one or more embodiments, the alloy has a corrosion current that is less than the corrosion current of the substrate. For example, the corrosion current is less than 10 $\mu A/cm^2$. In one or more embodiments, the bipolar plate of a fuel cell may include an alloy having the formula: $Cu_xFe_yTi_z$; where x is 0.35 to 0.55; y is 0.05 to 0.1; and z is 0.4 to 0.6. In various embodiments, the bipolar plate of the fuel cell may include an alloy having the formula: $Cu_xNi_yTi_z$; where x is 0 to 0.75; y is 0 to 0.45, and z is 0.25 to 0.75. In still other embodiments, the bipolar plate of the fuel cell may include an alloy having the formula: $Al_xFe_ySi_z$; where x is 0.05 to 0.63; y is 0.12 to 0.85; and z is 0.1 to 0.25. In other embodiments, the bipolar plate of a fuel cell may include an alloy having the formula: $Al_xMn_ySi_z$; where x is 0.45 to 0.66; y is 0.1 to 0.2; and z is 0.2 to 0.35. In yet another embodiment, the bipolar plate of a fuel cell may include an alloy having the formula: $Al_xNi_ySi_z$; where x is 0.52 to 0.79; y is 0.04 to 0.23; and z is 0.11 to 0.25. In a variation, the bipolar plate of a fuel cell may include an alloy having the formula: $Ni_xSi_yTi_z$; where x is 0 to 0.64; y is 0 to 0.2; and z is 0.16 to 0.8. In one or more embodiments, the bipolar plate of a fuel cell may include an alloy having the formula: $C_xFe_ySi_z$; where x is 0.1 to 0.25; y is 0.65 to 0.7; and z is 0.1 to 0.25. In a refinement, the bipolar plate and/or alloy are doped with less than or equal to 1 at. % of an element selected from the group consisting of La, P, B, C, Co, Zr, Cr, Nb, Mo, W, Sn, and a combination thereof. In a variation, the alloy has a partially amorphous structure. In one or more embodiments, the surface coating layer is 1 nm to 500 $\mu m$.

In one or more embodiments, bipolar plate of a fuel cell, the bipolar plate including an alloy having a formula: $Cu_xFe_yTi_z$, $Cu_xNi_yTi_z$, $Ni_xSi_yTi_z$, $C_xFe_ySi_z$, $Al_xMn_ySi_z$, or $Al_xNi_ySi_z$; where x is present up 0.885; y is present up 0.85; z is 0.05 to 0.8 and the sum of x, y, and z is 1.

In a refinement, the alloy has a partially amorphous structure. In a variation, the bipolar plate includes an alloy having the formula $Cu_xFe_yTi_z$; where x is 0.35 to 0.55; y is 0.05 to 0.1; and z is 0.4 to 0.6.

In one or more embodiments, a fuel cell including a proton exchange membrane, a plurality of catalyst electrode layers; and bipolar plates including an alloy having a formula:

$Cu_xFe_yTi_z$, $Cu_xNi_yTi_z$, $Ni_xSi_yTi_z$, $C_xFe_ySi_z$, $Al_xMn_ySi_z$, or $Al_xNi_ySi_z$; where x is present up to 0.885; y is present up to 0.85; z is 0.05 to 0.8 and the sum of x, y, and z is 1.

In a variation, the alloy has a partially amorphous structure. In various embodiments, the fuel cell includes the alloy having the formula: $Cu_xNi_yTi_z$; where x is 0 to 0.75; y is 0 to 0.45, and z is 0.25 to 0.75. In other embodiments, the fuel cell includes the alloy having the formula: $Al_xFe_ySi_z$; where x is 0.05 to 0.63; y is 0.12 to 0.85; and z is 0.1 to 0.25.

DETAILED DESCRIPTION

Figure 1:
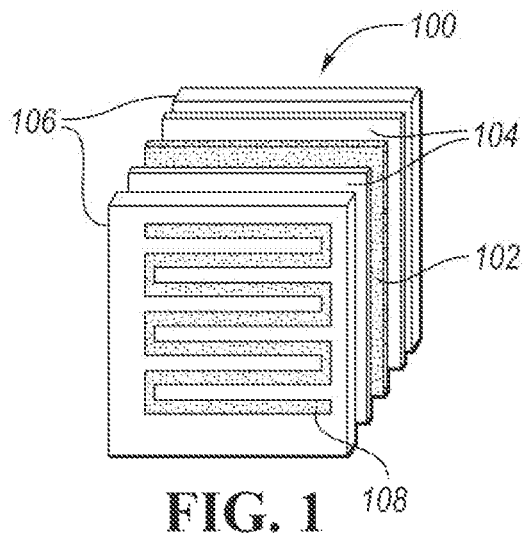
FIG. 1 is an exploded schematic of an individual fuel cell.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word about in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for given purpose in connection with the invention implies the mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

With respect to the terms "comprising," "consisting of," and "consisting essentially of," where one of these three terms is used herein, the presently disclosed and claimed subject matter can include the use of either of the other two terms.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Corrosion may cause degradation in fuel cell bipolar plates. Corrosion is a process by which refined metal is converted to a more chemically stable form such as the metal's oxide(s), hydroxide(s), sulfide(s), and/or other salts. The more chemically stable form may be less desirable because it exhibits one or more less desirable properties or inhibits one or more desirable properties. The conversion may present a steady destruction of the metal material. It may refer to the electrochemical oxidation of the metal with an oxidant such as oxygen. Corrosion may be invoked by exposure of the metal substrate to moisture in the air, to a solution with a relatively low pH, various chemical substances such as acids, microbes, elevated temperatures, and/or other factors. What is needed are alloys for use in fuel cell bipolar plates that have corrosion resistant characteristics. What is also needed are material for bipolar plates that have a relatively high mechanical strength.

Figure 2:
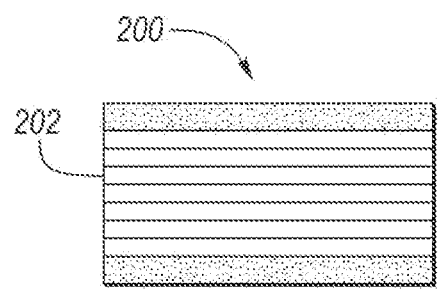
FIG. 2 is a side view of a fuel cell stack.
Figure 3A:
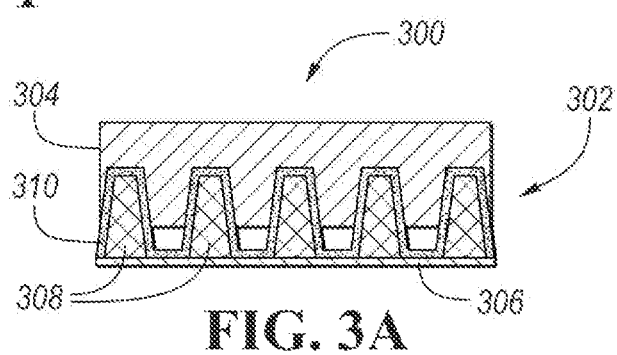
FIG. 3A is a partial cross-sectional view a fuel cell.
Figure 3B:
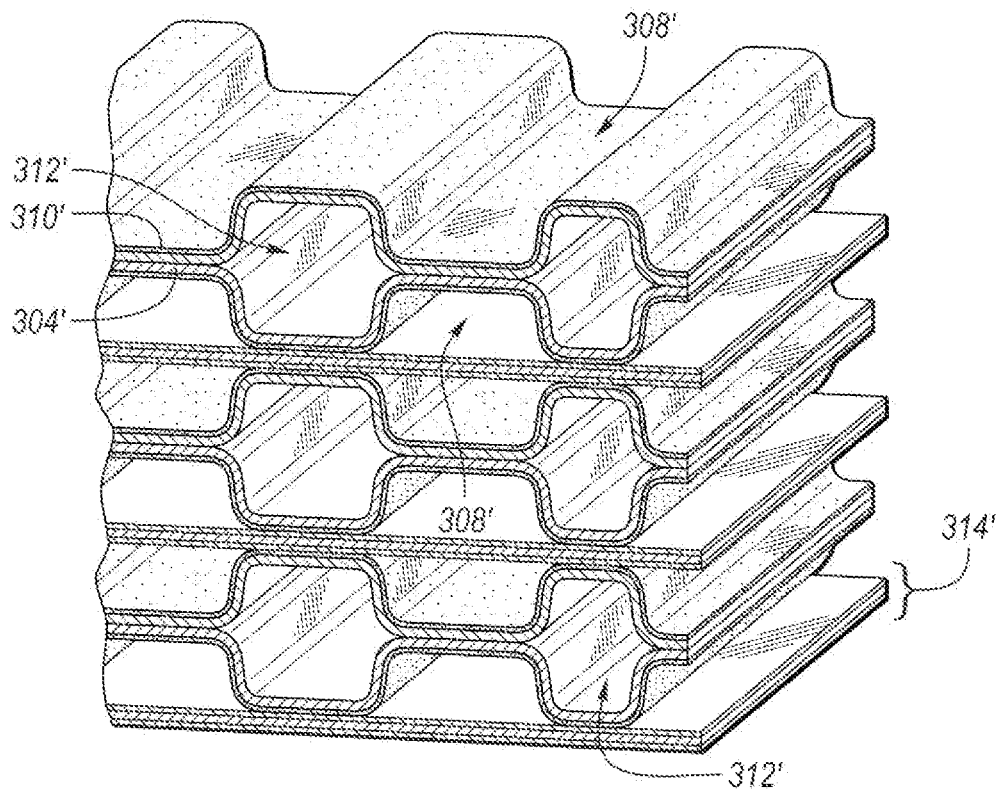
FIG. 3B is a schematic, perspective, partial cross-sectional view of a fuel cell.

FIG. 1 is a schematic perspective view of fuel cell 100. Fuel cell 100 includes electrode catalyst layer 104 and electrolyte 102. In one or more embodiments, the fuel cell may include a proton exchange membrane. Fuel cell 100 may be connected to an external circuit to provide power. Fuel cell 100 may include bipolar plates 106. Bipolar plates may provide structural support, conductivity, and may assist in supplying fuel. Bipolar plates may also assist in removal of reaction products or byproducts. Each bipolar plate 106 includes a flow passage 108 to assist in supplying fuel and/or removing by-products. Bipolar plates may help regulate or manage thermal conditions in a fuel cell. Bipolar plates may contribute significantly to the weight and cost of a fuel cell. Typically, bipolar plates may be made of metal or graphite. In one or more embodiments bipolar plates 106 may be flow field plates. In one or more embodiments, a fuel cell may include a gas diffusion layer. Bipolar plates may connect and divide individual fuel cells to form a fuel cell stack. Fuel cells may be stacked to increase voltage and/or power. FIG. 2 is a side view of fuel cell stack 200. Fuel cell stack 200 includes a plurality of fuel cells 202. Bipolar plates may include a coating, composite, and/or polymer. FIG. 3A is a cross-section of a portion of a fuel cell 300. Bipolar plate 302 includes a substrate 304, and a surface layer coating 310. FIG. 3A also includes an electrode catalyst layer 306 and flow passage 308. FIG. 3B is a schematic perspective partial cross-sectional view of a fuel cell stack including a bipolar plate with a substrate 304', a surface layer coating 310'. The bipolar plates define flow passage 308', and temperature control channel 312'. The fuel cell stack includes membrane electrode assembly 314'.

In one or more embodiments, the depth of flow passage 108 may be about 0.5 mm. In one or more embodiments, the width of flow passage 108 may be about 1 mm. In one or more embodiments, flow passage 108 may be greater than 1 mm.

In one or more embodiments, fuel cell 100 may be a proton exchange membrane fuel cell (PEMFC). A PEMFC includes a proton exchange membrane. PEMFCs may also be referred to as a polymer electrolyte membrane fuel cells or solid polymer electrolyte fuel cell. A membrane electrode assembly (MEA) refers to the membrane, electrodes and may refer to a catalyst or catalyst layer. The catalyst layer may include carbon paper or a carbon support. In one or more embodiments, the MEA may include a gas diffusion layer. Proton-exchange membrane fuel cells commonly operate in acidic environments and may have increased operating temperatures. For example, a PEMFC may operate between about 20 and 100° C. PEMFCs may be lightweight and generally provide high power densities. Although still elevated, PEMFCs may operate at lower temperatures compared with other fuel cell technologies and may have relatively shorter start up times. Accordingly, lightweight materials and/or anti-corrosive materials may be suitable for use in PEMFCs. The characteristic of PEMFCs make them well suited for mobile transportation technologies.

In one or more embodiments, a proton-exchange membrane may include Nafion XL, Nafion 112, Nafion 115, Nafion 117, and/or Nafion 1110. Nafion membranes may include a fluoropolymer. Electrodes may be made of carbon, carbon cloth and/or carbon fiber. Electrodes may include a catalyst. Catalyst may include but are not limited to platinum, nickel, palladium, and iridium. For example, platinum ruthenium on a carbon support may be used as the electrode catalyst layer.

As described above, corrosion may reduce the life or efficiency of fuel cells. Accordingly, various methods and materials have been employed to inhibit corrosion. Despite these efforts, corrosion remains a persistent impediment to advances in fuel cells.

Due to rising carbon dioxide emissions and the relatively high current dependency on non-renewable fossil fuels as energy carriers in the transportation sector, there is an ever increasing need to develop and commercialize transportation technologies that use clean and sustainable sources of energy. Advances in fuel cell technology may support efforts to a cleaner and more sustainable energy sources. Reduction in cost, weight, improved efficiency and longer life of a fuel cell (including PEMFCs) may be achieved by improvements in bipolar plates.

Bipolar plates may perform various functions including providing structural integrity or support, providing electrical or thermal conductivity, assisting in supplying fuel and/or removing reaction products. Bipolar plates may contribute about 70-80% of the total weight of a proton-exchange membrane fuel cell stack and more than 40% of the cost.

Alloys may provide unique benefits and properties suitable for bipolar plates. As used herein, in one or more embodiments, alloy refers to the mixing or combination of two or more elements. An alloy may include the mixing or combination of one or more metals with one or more metalloids or non-metals. An alloy may be crystalline, partially crystalline or amorphous. Crystalline materials exhibit an ordered structure whereas amorphous materials lack an ordered structure. A common amorphous material is glass. Hence glass, glassy, and amorphous are often used interchangeably. Alloys exhibiting amorphous properties may be referred to as metallic glasses. For example, an alloy may be considered amorphous if it is greater than or equal to 50% amorphous. In still other embodiments, an alloy may be considered amorphous if it is greater than or equal to 75% amorphous. In still more embodiments, an alloy may be considered amorphous if it greater than or equal to 99% amorphous. In one or more embodiments, an alloy may be considered partially amorphous if it is greater than or equal to 5% amorphous but less than 100% amorphous. In other embodiments an alloy may be considered partially amorphous if it is greater than or equal to 10% amorphous but less than 100% amorphous. In still other embodiments, an alloy may be considered partially amorphous if it is greater than or equal to 25% amorphous but less than 100% amorphous. In one or more embodiments, an alloy may be considered partially amorphous if it is greater than or equal to 50% amorphous but less than 100% amorphous. In one or more embodiments, the degree of crystallinity or lack thereof may be determined by using differential scanning calorimetry (DSC). In one or more embodiments, x-ray diffraction (XRD) techniques may be used to determine the presence of ordered structures. In one or more embodiments, differential thermal analysis (DTA) may be used to identify crystallinity. In one or more embodiments, the degree of amorphous structure or crystallinity may be characterized as short-range, medium-range, and long-range order. In one or more embodiments, substantially crystalline structures may exhibit long-range order. In one or more embodiments, amorphous structures may still exhibit short-range order.

In one or more embodiments, amorphous or partially amorphous alloys may exhibit improved mechanical strength and/or corrosion resistance. For example, one or more alloys with an amorphous structure may have a corrosion resistance one to two magnitudes greater than one or more of the alloys with crystalline structures. In one or more embodiments, alloys may have reduced weights. In one or more embodiments, amorphous or partially amorphous alloys may have further reduced weights. For example, one or more alloys including metallic glasses may weigh less than more traditional materials such as steel. In one or more embodiments, amorphous alloys may require controlled cooling or processing. In one or more embodiments, additional cost associated with controlled cooling may be necessary. However, in one or more embodiments, one or more benefits including but not limited to reduced weights, improved efficiency and/or longer lifespan may offset such cost. In one or more embodiments, the alloys described herein may be suitable for making bipolar plates. In one or more embodiments, fully or partially amorphous alloys may be suitable for making bipolar plates or for coating bipolar plates.

Amorphous metal alloys or partially amorphous metal alloys may be referred to as metastable. Metastable materials are stable but not in their most stable form. Metastable materials may need assistance to convert from the metastable state to a more stable state. A more stable state may be a crystalline structure. Metastable materials may need significant assistance, such as increases in temperature before converting from their metastable state to another more stable state. Accelerated cooling may inhibit converting to a more stable state. These materials may be suitable for use in various applications that do not promote leaving the metastable state. However, discovering metastable states can be challenging as such states may not commonly exist. As a result, identifying useful amorphous or partially amorphous alloys has been difficult. Generally, the greater the elemental components and the more diverse the elemental sizes the more likely an amorphous structure will be formed. However, even after identifying fully or partially amorphous alloys such materials may not be useful without tuning and optimization. For example, formability of a material is a practical consideration for any industrial application including the production of bipolar plates. This often requires consideration of various processing parameters such as temperature treatments (e.g. heating and/or cooling processes). Doping and/or additives may also present various opportunities for optimization.

In one or more embodiments, the alloys described herein may have a glass transition temperature ($T_g$) and a first onset crystallization temperature ($T_x$). In one or more embodiments, the difference between $T_x$ and $T_g$ may be used to determine suitable materials. For example, $T_x$ may be greater than or equal to about 10° C. more than $T_g$. In one or more embodiments, $T_x$ may be greater than or equal to about 25° C. more than $T_g$. In other embodiments, $T_x$ may be greater than or equal to about 49° C. more than $T_g$. In one or more embodiments, $T_x$ may be greater than or equal to about 60° C. more than $T_g$. In still other embodiments, $T_x$ may be greater than or equal to about 67° C. more than $T_g$. In one or more embodiments, $T_g$ and $T_x$ may be determined using differential scanning calorimetry (DSC).

One or more machine learning algorithms may be used to determine alloys for bipolar plates. One or more machine learning algorithms may be used to determine fully or partially amorphous alloys for bipolar plates. One or more machine learning algorithms may be trained with experimental data from the Nonequilibrium Phase Diagrams of Ternary Amorphous Alloys from the Landolt-Bornstein collection database. One or more machine learning algorithm may use a series of Random Forest classifiers created with a random subspace method and a set of attributes, to form a type of decision tree. The algorithm may be configured to predict the probability of an alloy forming an amorphous structure. More details regarding this strategy can be located at Ward, Logan, et al., A General-Purpose Machine Learning Framework for Predicting Properties of Inorganic Materials, NPJ COMPUTATIONAL MATERIALS 2 (2016) (available at https://www.nature.com/articles/npjcompumats201628 #supplementary-information).

The attributes may include stoichiometric characteristics based on $L^p$ norms where p=0, 2, 3, 5, 7, and 10. For example, the p=2 norm for $TiO_2$ is $$\|x\|_2 = \left(\left(\frac{1}{3}\right)^2 + \left(\frac{2}{3}\right)^2\right)^{1/2} \cong 0.745 \qquad (1)$$

The attributes may include statistics such as the minimum, maximum, range, fraction-weighted mean, average deviation, mode for properties including atomic number, atomic weight, row, column, covalent radius, electronegativity, melting temperature, Mendeleev number, number of d valence electrons, number of f valence electrons, number of s valence electrons, number of p valence electrons, total number of valence electrons, number of unfilled d states, number of unfilled f states, number of unfilled s states, number of unfilled p states, total number of unfilled states, magnetic moment (per atom) of 0 K ground state, space group number of 0 K ground state, specific volume of 0 K ground state, band gap energy of 0 K ground states. The attributes may also include a fraction weighted average of the number of valence electrons in each orbital. The attributes may include a Boolean representing whether a neutral ionic compound may be formed. The attributes may include the mean ionic character and the fraction of ionic character for a binary compound represented by the formula:

$$I(X_A, X_B) = 1 - \exp(-0.25(X_A - X_B)^2) \qquad (2)$$

where I is the fraction of ionic character, $X_A$ is the electronegativity of element A, and $X_B$ is the electronegativity of element B.

Figure 15:
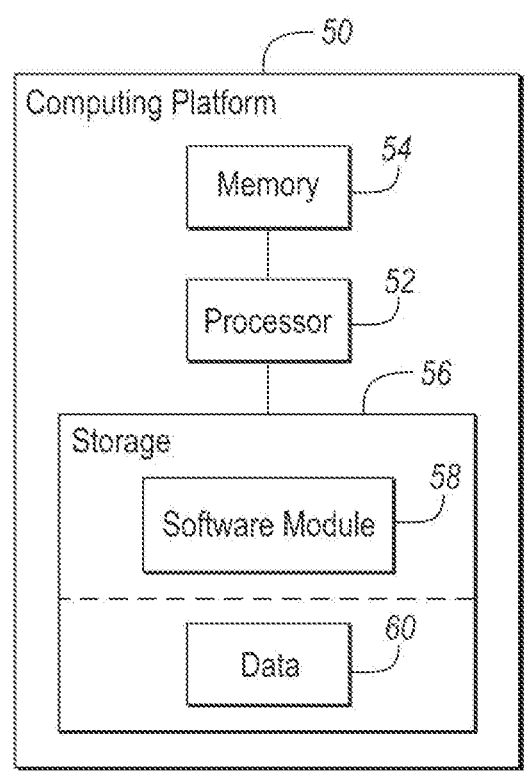
FIG. 15 is a schematic diagram of a computing platform that may be utilized to implement algorithms described herein.

The machine learning algorithms described herein may be implemented using a computer platform 50 illustrated in FIG. 15. The computing platform 50 may include a processor 52, memory 54, and non-volatile storage 56. The processor 52 may include one or more devices selected from high-performance computing systems including high-performance cores, microprocessors, micro-controllers, digital signal processors, microcomputers, central processing units, field programmable gate arrays, programmable logic devices, state machines, logic circuits, analog circuits, digital circuits, or any other device that manipulate signals (analog or digital) based on computer-executable instructions residing in the memory 54. The memory 54 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage 56 may include one or more persistent data storage devices such as a hard drive, optical drive, tape drive, non-volatile solid state device, cloud storage or any other device capable of persistently storing information.

The processor 52 may be configured to read into memory 54 and execute computer-executable instructions of the non-volatile storage 56 and embodying one or more of the algorithms described herein. Executable instruction may reside in a software module 58. The software module 58 may include operating systems and applications. The software module 58 may be compiled or interpreted from a computer program created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 52, the computer-executable instruction of the software module 58 may cause the computing platform 50 to implement one or more of the algorithms disclosed herein. Non-volatile storage 56 may also include data 60 supporting the functions, features, calculations, and processes.

The program code embodying the algorithms described herein is capable of being individually or collectively distributed as a program product in a variety of different form.

The program code may be distributed using a computer readable storage medium having computer readable program instructions thereon for causing a processor to carry out aspects. Computer readable storage media, which is inherently non-transitory, may include volatile or non-volatile, and removable and non-removeable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device form of a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement functions, acts, and/or operations described herein. The functions, acts, and/or operations described herein may be re-ordered, processed serially, and/or processed concurrently.

One or more additional considerations may be used to determine alloys suitable for bipolar plates. For example, alloys including a significant amount of one or more of the following elements beryllium (Be), arsenic (As), cadmium (Cd), mercury (Hg), thallium (Tl), and lead (Pb) may not be suitable for bipolar plates because these elements may be considered toxic. As another example, alloys including a significant amount of one or more of the following elements lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), and ytterbium (Yb) may not be suitable for bipolar plates because of significant expense associated with mining ore-deposits for these elements. In yet another example, alloys including a significant amount of one or more of the precious metals rhenium (Re), ruthenium (Ru), rhodium (Rh), palladium (Pd), silver (Ag), osmium (Os), iridium (Ir), platinum (Pt), and gold (Au) may not be suitable for bipolar plates because of the significant expense of these elements. Also, in one or more embodiments, alloys including a significant amount of one or more of the elements gallium (Ga), germanium (Ge), yttrium (Y), indium (In), and hafnium (Hf) may not be suitable for bipolar plates because the scarcity of these elements. Based on the above analysis, in one or more embodiments, aluminum (Al), carbon (C), copper (Cu), iron (Fe), manganese (Mn), nickel (Ni), silicon (Si), and titanium (Ti) have been identified as viable options for bipolar plates.

Alloys including partially or fully amorphous alloys may be suitable for bipolar plates. In one or more embodiments, one or more alloys may be used to form a bipolar plate. In one or more embodiments, a bipolar plate may be coated with one or more alloys. In one or more embodiments, one or more alloys may be applied to a bipolar plate.

In one or more embodiments, a bipolar plate may include an alloy of aluminum (Al), copper (Cu), and titanium (Ti). The composition of an alloy may be represented by the following formula:

$$Al_xCu_yTi_z \quad (3)$$

where x is more than or equal to 0 and less than or equal to 0.885 ($0 \leq x \leq 0.885$); y is more than or equal to 0 and less than or equal to 0.85 ($0 \leq y \leq 0.85$); z is more than or equal to 0.05 and less than or equal to 0.8 ($0.05 \leq z \leq 0.8$), and x+y+z=1.

In other embodiments, x is more than or equal to 0 and less than or equal to 0.55 ($0 \leq x \leq 0.55$); y is more than or equal to 0.25 and less than or equal to 0.75 ($0.25 \leq y \leq 0.75$); and z is more than or equal to 0.05 and less than or equal to 0.65 ($0.05 \leq z \leq 0.65$). For example, x may be any of the following numbers or in a range of any two of the numbers 0, 0.05, 0.1, 0.15, 0.2, 0.25, 0.3, 0.35, 0.4, 0.45, 0.5, and 0.55; y may be any of the following numbers or in a range of any two of the numbers 0.25, 0.3, 0.35, 0.4, 0.45, 0.5 0.55, 0.60, 0.65, 0.7, and 0.75; and z may be any of the following numbers or in a range of any two of the numbers 0.05, 0.1, 0.15, 0.2, 0.25, 0.3, 0.35, 0.4, 0.45, 0.5, 0.55, 0.6, and 0.65.

Figure 4:
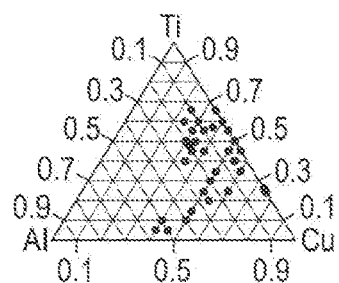
FIG. 4 is a ternary plot depicting alloys compositions including the elements of aluminum (Al), copper (Cu) and titanium (Ti).

For example, the composition represented by the formula $Al_{0.05}Cu_{0.38}Ti_{0.57}$ may be used. Additional embodiments may use one or more of the following compositions $Al_{0.1}Cu_{0.25}Ti_{0.65}$, $Al_{0.15}Cu_{0.25}Ti_{0.6}$, $Al_{0.2}Cu_{0.3}Ti_{0.5}$, $Al_{0.25}Cu_{0.35}Ti_{0.4}$, $Al_{0.3}Cu_{0.5}Ti_{0.2}$, $Al_{0.35}Cu_{0.5}Ti_{0.15}$, $Al_{0.4}Cu_{0.5}Ti_{0.1}$, $Al_{0.5}Cu_{0.4}Ti_{0.1}$, $Al_{0.5}Cu_{0.45}Ti_{0.05}$, and $Al_{0.55}Cu_{0.4}Ti_{0.05}$. Additional embodiment may include one or more of the compositions represented in FIG. 4.

One or more compositions may have a higher aluminum (Al) content and produce a lower weight material. For example, some embodiments using the composition $Al_{0.55}Cu_{0.4}Ti_{0.05}$ with a higher amount of aluminum have a lower weight as compared to an iron-based or steel material. Other embodiments with compositions having a high aluminum content may also be lightweight materials suitable for bipolar plates. For example, x may be greater than or equal to 0.1 and may exhibit weights less than traditional steel alloys. In one or more embodiments x may be greater than or equal to 0.25 and may exhibit even lower weights compared with traditional steel materials. In one or more embodiments x may be greater than or equal 0.45 and may exhibit considerably lower weights compared with traditional materials. For example, x may be any of the following numbers or in a range of any two of the numbers 0.55, 0.54, 0.53, 0.52, 0.53, 0.52, 0.51, 0.50, 0.49, 0.48, 0.47, 0.46, and 0.45.

One or more compositions may have more copper and greater thermal and/or electrical conductivity. For example, y may be greater than or equal to 0.5 and may have greater conductivity. In one or more embodiments y may be greater than 0.65 and may have further improved conductivity. For example, y may be any of the following numbers or in a range of any two of the numbers 0.65, 0.66, 0.67, 0.68, 0.69, 0.7, 0.71, 0.72, 0.73, 0.74, and 0.75.

One or more compositions may have less titanium and reduced cost. For example, z may be less than or equal to 0.4 and may have reduced cost. In one or more embodiments, z may be less than or equal to 0.25 and may have further reduced cost. In one or more embodiments, z may be less than or equal to 0.1 and may have exceptionally lower cost. For example, z may be any of the following numbers or in a range of any two of the numbers 0.05, 0.06, 0.07, 0.08, 0.09, and 0.1.

One or more compositions may have more titanium and may exhibit higher corrosion-resistant properties. For example, z may be more than or equal 0.1 and may exhibit greater corrosion resistance. In one or more embodiments z may be more than or equal to 0.25 and may exhibit even greater corrosion resistance. In one or more embodiments, z may be more than or equal to 0.45 and exceptional corrosion resistance may be obtained. For example, z may be any of the following numbers or in a range of any two of the numbers 0.55, 0.56, 0.57, 0.58, 0.59, 0.6, 0.61, 0.62, 0.63, 0.64, and 0.65.

In one or more embodiments, an alloy including aluminum (Al), copper (Cu), and titanium (Ti) may be produced by mixing aluminum, copper and titanium powders in the appropriate proportions as discussed herein. In one or more embodiments, the powder mixture may then be introduced to a high-energy mechanical alloying process. In one or more embodiments, mechanical alloying may occur under an inert environment.

For example, an alloy may be formed by mixing elemental powders of aluminum (Al), copper (Cu), and titanium (Ti) in proportions discussed herein. The elemental powders may be greater than or equal to 99.5% purity with a particle size of 45 to 100 μm. In one or more embodiments, a Retsch PM 400 high-energy planetary ball mill may be used for mechanically alloying under an argon (Ar) atmosphere. Stainless steel balls with a diameter of 10 mm may be used as a milling medium. In one or more embodiments, the weight of milling medium used may be 10 times as much as the weight of the powder. In one or more embodiments, the rotational speed of the high-energy planetary ball mill may be 300 rotations per minute (rpm). In one or more embodiments, stearic acid may be used as a processing agent. In one or more embodiments, stearic acid may prevent the elemental powders from adhering to the milling medium or ball mill. For example, stearic acid may be added at less than or equal to 1% by weight of the elemental powders. In one or more embodiments, the powders may be milled for greater than or equal to 30 hours to form a glassy powder. In one or more embodiments, a partially or fully amorphous alloy may be formed. In one or more embodiments, a glassy powder may be processed at 250° C.±5° C. to form a bipolar plate or to coat a substrate to form a bipolar plate. In one or more embodiments, a glassy powder may be processed at greater than 250° C. In one or more embodiments, a rapid cooling technique may be used.

In one or more embodiments, the elemental powder particles may be irregularly shaped. In one or more embodiments, the aluminum (Al) powder may have a wide particle size distribution. In one or more embodiments, the aluminum (Al) powder may have a narrow particle size distribution. In one or more embodiments, the aluminum (Al) powder may have a mean particle diameter of about 53 μm. In one or more embodiments, the glassy powder may have an irregular particle shape. In one or more embodiments, the glassy powder may have mean particle diameter of about 7 μm. In one or more embodiments, the glassy powder may have a narrow particle size distribution.

In one or more embodiments, an alloy suitable for bipolar plates may include aluminum (Al), iron (Fe), and nickel (Ni). In one or more embodiments, the composition may be represented by the following formula:

$$Al_xFe_yNi_z \quad (4)$$

where x is more than or equal to 0 and less than or equal to 0.885 (0≤x≤0.885); y is more than or equal to 0 and less than or equal to 0.85 (0≤y≤0.85); z is more than or equal to 0.05 and less than or equal to 0.8 (0.05≤z≤0.8), and x+y+z=1.

In one or more embodiments, x is more than or equal to 0.65 and less than or equal to 0.985 (0.65≤x≤0.985); y is more than or equal to 0.01 and less than or equal to 0.24 (0≤y≤0.24); and z is more than or equal to 0.01 and less than or equal to 0.223 (0.01≤z≤0.223). These embodiments may exhibit lighter weights compared to traditional materials for bipolar plates. In one or more embodiments, x may be any of the following numbers or in a range of any two of the numbers 0, 0.65, 0.7, 0.75, 0.8, 0.85, 0.9, 0.95, and 0.985; y may be any of the following numbers or in a range of any two of the numbers 0.01, 0.05, 0.1, 0.15, 0.2, and 0.24; and z may be any of the following numbers or in a range of any two of the numbers 0.01, 0.05, 0.1, 0.15, 0.2, and 0.223.

In one or more embodiments, x is more than or equal to 0.75 and less than or equal to 0.885 (0.75≤x≤0.885); y is more than or equal to 0.05 and less than or equal to 0.14 (0.05≤y≤0.14); and z is more than or equal to 0.085 and less than or equal to 0.123 (0.085≤z≤0.123). These embodiments may exhibit lighter weights compared to traditional materials for bipolar plates. In one or more embodiments, x may be any of the following numbers or in a range of any two of the numbers 0, 0.75, 0.76, 0.77, 0.78, 0.79, 0.80, 0.81, 0.82, 0.83, 0.84, 0.85, 0.86, 0.87, 0.88, and 0.885; y may be any of the following numbers or in a range of any two of the numbers 0.05, 0.06, 0.07, 0.08, 0.09, 0.1, 0.11, 0.12, 0.13, and 0.14; and z may be any of the following numbers or in a range of any two of the numbers 0.085, 0.09, 0.1, 0.11, 0.12, and 0.123.

Figure 5:
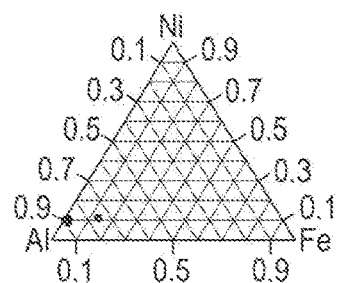
FIG. 5 is a ternary plot depicting alloys compositions including the elements of aluminum (Al), iron (Fe), and nickel (Ni).

For example, the composition $Al_{0.75}Fe_{0.14}Ni_{0.11}$ may be used. Additional embodiments may use one or more of the following compositions $Al_{0.86}Fe_{0.02}Ni_{0.12}$, $Al_{0.87}Fe_{0.01}Ni_{0.12}$, and $Al_{0.88}Fe_{0.03}Ni_{0.11}$. Additional embodiments may include one or more of the compositions represented in FIG. 5.

One or more compositions represented by the formula $Al_{0.885}Fe_{0.03}Ni_{0.085}$ may have reduced weights as compared to a traditional iron-based or steel material. One or more compositions having higher aluminum (Al) content may be lightweight or ultralight weight and suitable for bipolar plates. In one or more embodiments, x may be greater than or equal 0.8 and have reduced weights. For example, x may be any of the following numbers or in a range of any two of the numbers 0.80, 0.81, 0.82, 0.83, 0.84, 0.85, 0.86, 0.87, 0.88, and 0.885. In one or more embodiments, x may be greater than or equal to 0.85 and may have exceptionally lower weights compared with traditional materials.

One or more compositions may have more iron (Fe) and improved workability. In one or more embodiments, alloys with greater iron content may be easier to shape or manufacture. Embodiments with more iron (Fe) may also have reduced raw material cost. For example, y may be greater than or equal to 0.1 and greater workability and/or reduced cost may be obtained. In one or more embodiments, y may be any of the following numbers or in a range of any two of the numbers 0.1, 0.11, 0.12, 0.13, and 0.14.

One or more embodiments may have more nickel (Ni) and greater corrosion-resistant properties. For example, z may be greater than or equal to 0.1 and may exhibit improved corrosion resistance. In one or more embodiments, z may be any of the following numbers or in a range of any two of the numbers 0.1, 0.11, 0.12, and 0.123.

In one or more embodiments, an alloy including aluminum (Al), iron (Fe), and nickel (Ni) may be produced by mixing aluminum (Al), iron (Fe) and nickel (Ni) powders in the proportions discussed herein. In one or more embodiments, the mixture may be mechanically alloyed. In one or more embodiments, the mixture may be mechanically alloyed until a glassy powder is formed. In one or more embodiments, the mixture may be heated under an inert atmosphere for processing.

For example, greater than or equal to 99% pure aluminum (Al) powder may be mixed with greater than or equal to 99.9% pure iron (Fe) powder and greater than or equal to 99% pure nickel (Ni) powder. In one or more embodiments, the mixture may be mechanical alloyed by ball milling in a steel container at room temperature. In one or more embodiments, mechanical alloying may occur under an inert environment. In one or more embodiments, an inert environment may be an argon (Ar) atmosphere. The ball mill may be rotated at 400 rpm and the milling medium may have a weight of 10 times the weight of the elemental powder. In one or more embodiments, the elemental powders may be mixed for 1 hour. In other embodiments the mixture may be milled for 5 hours. In still other embodiments, the mixture may be milled for 10 hours. In further embodiments, the mixture may be milled for greater than or equal to 30 hours. In one or more embodiments, a substantially amorphous structure may be obtained after 25 or more hours of mechanical alloying. In one or more embodiments, a partially amorphous structure may be obtained after 10 hours of mechanical alloying. In one or more embodiments, less than or equal 1 wt. % stearic acid may be used as a processing agent. In one or more embodiments, the alloyed mixture may be heated under an argon atmosphere for processing. In one or more embodiments, the alloyed mixture may be heated up to 1000° C. In one or more embodiments, the alloyed mixture may be heated up to 800° C. In one or more embodiments, the alloyed mixture may be heated up to 400° C. In one or more embodiments, the processing may form a partially or fully amorphous alloy.

In one or more embodiments, an alloy suitable for bipolar plates may include aluminum (Al), manganese (Mn), and nickel (Ni). In one or more embodiments, the composition may be represented by the following formula:

$$Al_xMn_yNi_z \qquad (5)$$

where x is more than or equal to 0 and less than or equal to 0.885 (0≤x≤0.885); y is more than or equal to 0 and less than or equal to 0.85 (0≤y≤0.85); z is more than or equal to 0.05 and less than or equal to 0.8 (0.05≤z≤0.8), and x+y+z=1.

In one or more embodiments, x is more than or equal to 0.765 and less than or equal to 0.98 (0.765≤x≤0.98); y is more than or equal to 0 and less than or equal to 0.125 (0≤y≤0.125); and z is more than or equal to 0.01 and less than or equal to 0.225 (0.01≤z≤0.225). For example, x may be any of the following numbers or in a range of any two of the numbers 0.765, 0.8, 0.85, 0.9, 0.95, and 0.98; y may be any of the following numbers or in a range of any two of the numbers 0, 0.025, 0.05, 0.075, 0.1, and 0.125; and z may be any of the following numbers or in a range of any two of the numbers 0.01, 0.05, 0.1, 0.15, 0.2, and 0.225.

In one or more embodiments, x is more than or equal to 0.865 and less than or equal to 0.88 (0.865≤x≤0.88); y is more than or equal to 0.005 and less than or equal to 0.025 (0.005≤y≤0.025); and z is more than or equal to 0.1 and less than or equal to 0.125 (0.1≤z≤0.125). For example, x may be any of the following numbers or in a range of any two of the numbers 0.865, 0.87, 0.875, and 0.88; y may be any of the following numbers or in a range of any two of the numbers 0.005, 0.01, 0.02, and 0.025; and z may be any of the following numbers or in a range of any two of the numbers 0.1, 0.11, 0.12, and 0.125.

Figure 6:
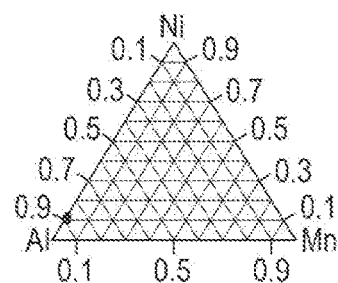
FIG. 6 is a ternary plot depicting alloys compositions including the elements of aluminum (Al), manganese (Mn), and nickel (Ni).

In one or more embodiments, one or more of the following compositions $Al_{0.88}Mn_{0.02}Ni_{0.1}$ and $Al_{0.87}Mn_{0.01}Ni_{0.12}$ may be used. Additional embodiments may include one or more of the compositions represented in FIG. 6.

One or more compositions may have higher aluminum (Al) content and may produce lighter weight materials. For example, the composition represented by the formula $Al_{0.88}Mn_{0.02}Ni_{0.1}$ may be used because of the reduced weight as compared to a traditional iron-based or steel material. These compositions may be referred to as light weight or ultralight weight materials.

One or more compositions may have higher manganese (Mn) content and may also provide improved strength and hardening. Embodiments having a higher manganese (Mn) content may produce more corrosion resistant materials. For example, a composition where y is 0.025 may have improved corrosion resistance and/or strength.

One or more compositions may have a higher nickel (Ni) content and may produce better corrosion resistance. One or more compositions with higher nickel (Ni) may be more workable or malleable. For example, a composition where z is any of the following numbers or in a range of any two of the numbers 0.120, 0.121, 0.122, 0.123, 0.124, and 0.125 may have improved corrosion resistance and/or improved processability.

In one or more embodiments, an alloy including aluminum (Al), manganese (Mn), and nickel (Ni) may be produced by mixing aluminum (Al), manganese (Mn) and nickel (Ni) powders in the proportions discussed above. This mixture may be heated in a furnace to form a melt. The melt may be cooled rapidly by a rapid solidification process. In one or more embodiments, melt spinning may be used as a rapid solidification process. For example, rapid solidification processes may have cooling rates of about 10,000 to 10,000,000 K/s. Any other rapid solidification process known to one skilled in the art may be used.

In one or more embodiments, another alloy suitable for bipolar plates may include aluminum (Al), nickel (Ni), and titanium (Ti). In one or more embodiments, the composition may be represented by the following formula:

$$Al_xNi_yTi_z \qquad (6)$$

where x is more than or equal to 0 and less than or equal to 0.885 (0≤x≤0.885); y is more than or equal to 0 and less than or equal to 0.85 (0≤y≤0.85); z is more than or equal to 0.05 and less than or equal to 0.8 (0.05≤z≤0.8), and x+y+z=1.

In one or more embodiments, x is more than or equal to 0 and less than or equal to 0.3 (0≤x≤0.3); y is more than or equal to 0.2 and less than or equal to 0.4 (0.2≤y≤0.4); and z is more than or equal to 0.4 and less than or equal to 0.7 (0.4≤z≤0.7). For example, x may be any of the following numbers or in a range of any two of the numbers 0, 0.05, 0.1, 0.15, 0.2, 0.25, and 0.3; y may be any of the following numbers or in a range of any two of the numbers 0.2, 0.25, 0.30, 0.35, and 0.4; and z may be any of the following numbers or in a range of any two of the numbers 0.4, 0.45, 0.50, 0.55, 0.6, 0.65, and 0.7.

Figure 7:
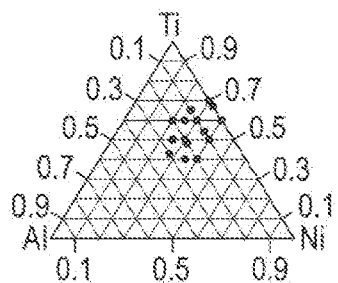
FIG. 7 is a ternary plot depicting alloys compositions including the elements of aluminum (Al), nickel (Ni), and titanium (Ti).

In one or more embodiments, one or more of the compositions represented by the formulas $Al_{0.1}Ni_{0.25}Ti_{0.65}$, $Al_{0.15}Ni_{0.25}Ti_{0.6}$, $Al_{0.2}Ni_{0.2}Ti_{0.6}$, $Al_{0.25}Ni_{0.25}Ti_{0.5}$, and $Al_{0.3}Ni_{0.28}Ti_{0.42}$ may be used. Additional embodiments may include one or more of the compositions represented in FIG. 7.

One or more compositions may have a higher aluminum (Al) content and may produce lighter weight materials as compared with traditional bipolar plate materials. For example, x may be greater than or equal 0.15 may have reduced weights. In one or more embodiments x may be greater than or equal to 0.2 and may have even further reduced weights. For example, x may be any of the following numbers or in a range of any two of the numbers 0.2, 0.21, 0.22, 0.23, 0.24, 0.25, 0.26, 0.27, 0.28, 0.29 and 0.30. In one or more embodiments, the composition represented by the formula $Al_{0.3}Ni_{0.28}Ti_{0.42}$ may be used because of the reduced weight as compared to a traditional iron-based or steel material.

One or more compositions may have a higher nickel content and may produce better corrosion resistance and produce more workable or malleable materials. In one or more embodiments, improved corrosion resistance and workability may be present where y is greater than or equal to 0.85. For example, y may be any of the following numbers or in a range of any two of the numbers 0.75, 0.76, 0.77, 0.78, 0.79, 0.8, 0.81, 0.82, 0.83, 0.84, and 0.85.

One or more compositions may have more titanium and may exhibit higher corrosion-resistant properties. In one or more embodiments z may be more than or equal to 0.75 and may exhibit greater corrosion resistance. In one or more embodiments, z may be more than or equal to 0.8 and may exhibit even greater corrosion resistance. In one or more embodiments z may be more than or equal to 0.85 and exceptional corrosion resistance may be obtained. For example, z may be any of the following numbers or in a range of any two of the numbers 0.8, 0.81, 0.82, 0.83, 0.84, 0.85, 0.86. 0.87, 0.88, and 0.885.

In one or more embodiments, an alloy including aluminum (Al), nickel (Ni), and titanium (Ti) may be produced by mixing aluminum (Al), nickel (Ni) and titanium (Ti) powders in the proportions discussed herein. The mixture may be mechanically alloyed. For example, ball milling may be used. After mixing and/or alloying, the mixture may be pressed. In one or more embodiments, a hot-press may be used. In one or more embodiments, the mixture may be exposed to a high temperature and/or pressure. In one or more embodiments, the glass forming ability may be improved by the presence of small amounts of zirconium (Zr) and/or copper (Cu).

For example, elemental powders with greater than or equal to 99.9% purity may be mixed. The mixed powders may be mechanically alloyed in a planetary ball mill, such as a QM-3SP4L. In one or more embodiments, the ball mill may be operated at 400 rpm. In one or more embodiments, the milling may occur in stainless steel vials. In one or more embodiments, the milling medium may be steel balls, such as GCr15. In one or more embodiments, the weight of the milling medium may be 20 times the weight of the elemental powder. In one or more embodiments, the milling may occur under an inert atmosphere such as argon. In one or more embodiments, milling may occur for 10 hours. In one or more embodiments, milling may occur for greater than or equal to 110 hours. In one or more embodiments, milling for 110 hours may form a substantially amorphous structure. In one or more embodiments, milling for less than 110 hours may form a partially amorphous structure.

In one or more embodiments, copper (Cu) may be present at less than or equal to 1 at. %. For example, glass forming ability may be improved by adding 0.3 at. % copper (Cu). In one or more embodiments, copper (Cu) may be present at less than or equal to 15 at. %. In one or more embodiments, zirconium (Zr) may be present at less than or equal to 15 at. %. For example, up to 11 at. % zirconium (Zr) may be added to improve glass forming ability. In another example, one or more embodiments may have zirconium (Zr) present in an amount of 5 at. %.

In one or more embodiments, the mechanically alloyed mixture may be consolidated in a vacuum hot-pressing machine. In one or more embodiments, hot pressing may be conducted at a temperature of about 460° C. (733 K) for 20 minutes. In one or more embodiments, hot pressing may occur under a pressure of 3 GPa. In one or more embodiments, a partially or fully amorphous alloy may be formed In one or more embodiments, an alloy suitable for bipolar plates may include copper (Cu), iron (Fe), and titanium (Ti). In one or more embodiments, the composition may be represented by the following formula:

$$Cu_xFe_yTi_z \qquad (7)$$

where x is more than or equal to 0 and less than or equal to 0.885 (0≤x≤0.885); y is more than or equal to 0 and less than or equal to 0.85 (0≤y≤0.85); z is more than or equal to 0.05 and less than or equal to 0.8 (0.05≤z≤0.8), and x+y+z=1.

In one or more embodiments, x is more than or equal to 0.35 and less than or equal to 0.55 (0.35≤x≤0.55); y is more than or equal to 0.05 and less than or equal to 0.1 (0.05≤y≤0.1); and z is more than or equal to 0.4 and less than or equal to 0.6 (0.4≤z≤0.6). For example, x may be any of the following numbers or in a range of any two of the numbers 0.35, 0.4, 0.45, 0.50, and 0.55; y may be any of the following numbers or in a range of any two of the numbers 0.05, 0.06, 0.07, 0.08, 0.09 and 0.1; and z may be any of the following numbers or in a range of any two of the numbers 0.4, 0.45, 0.50, 0.55, and 0.6.

Figure 8:
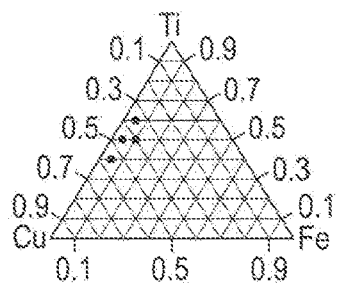
FIG. 8 is a ternary plot depicting alloys compositions including the elements of copper (Cu), iron (Fe), and titanium (Ti).

For example, one or more compositions represented by the formulas $Cu_{0.35}Fe_{0.05}Ti_{0.6}$, $Cu_{0.4}Fe_{0.1}Ti_{0.5}$, $Cu_{0.45}Fe_{0.05}Ti_{0.5}$, and $Cu_{0.55}Fe_{0.05}Ti_{0.4}$ may be used. Additional embodiments may include one or more of the compositions represented in FIG. 8.

One or more compositions may have greater copper (Cu) content and may exhibit improved thermal and/or electrical conductivity. In one or more embodiments x may be greater than or equal to 0.45 and may have improved conductivities. In one or more embodiments x may be greater than or equal to 0.50 and may have even greater conductivities. For example, x may be any of the following numbers or in a range of any two of the numbers 0.50, 0.51, 0.52, 0.53, 0.54 and 0.55.

One or more compositions may have greater iron (Fe) and may exhibit similar properties to traditional steel. Embodiments with more iron (Fe) may have reduced cost and/or provide high strength. In one or more embodiments, y may be greater than or equal to 0.08. For example, y may be any of the following numbers or in a range of any two of the numbers 0.08, 0.09 and 0.1.

One or more compositions may have a higher titanium content and may produce lighter weight materials as compared with traditional bipolar plate materials. For example, z may be greater than or equal 0.5 and have further reduced weights. For example, z may be any of the following numbers or in a range of any two of the numbers 0.5, 0.51, 0.52, 0.53, 0.54, 0.55, 0.56, 0.57, 0.58, 0.59, and 0.6. For example, embodiments similar to the composition represented by the formula $Cu_{0.35}Fe_{0.05}Ti_{0.6}$ may be useful in lightweight applications and may exhibit weights less than traditional steel materials.

In one or more embodiments, an alloy including copper (Cu), iron (Fe), and titanium (Ti) may be produced by mixing copper (Cu), iron (Fe), and titanium (Ti) in the proportions discussed herein. This mixture may be heated to high temperatures. In one or more embodiments the mixture may be heated to a temperature of 1600° C. (1873 K). The mixture may be quenched to achieve an amorphous or partially amorphous alloy. Small amounts of nickel (Ni) and/or zirconium (Zr) may be added to assist in the formation of an amorphous alloy.

In one or more embodiments, nickel (Ni) may be present at less than or equal to 30 at. %. In one or more embodiments, zirconium may be present at less than or equal to 15 at. %. For example, nickel may be added at about 8 at. %. In one or more embodiments, nickel may be added at less than 8 at. %. In one or more embodiments, zirconium may be added at about 11 at. %. In one or more embodiments, zirconium may be added at less than 11 at. %. After mixing, the mixture may be hot-pressed.

In one or more embodiments, 99.9% or greater pure copper (Cu), iron (Fe) and titanium (Ti) elemental powders may be mixed. In one or more embodiments, the powder mixture may be arc-melted. In one or more embodiments, an inert environment may be used such as an argon atmosphere. In one or more embodiments a titanium getter may be used.

In one or more embodiments, an alloy suitable for bipolar plates may include copper (Cu), nickel (Ni), and titanium (Ti). In one or more embodiments, the composition may be represented by the following formula:

$$Cu_xNi_yTi_z \qquad (8)$$

where x is more than or equal to 0 and less than or equal to 0.885 ($0 \leq x \leq 0.885$); y is more than or equal to 0 and less than or equal to 0.85 ($0 \leq y \leq 0.85$); z is more than or equal to 0.05 and less than or equal to 0.8 ($0.05 \leq z \leq 0.8$), and $x+y+z=1$.

In one or more embodiments, x is more than or equal to 0 and less than or equal to 0.75 ($0 \leq x \leq 0.75$); y is more than or equal to 0 and less than or equal to 0.45 ($0 \leq y \leq 0.45$); and z is more than or equal to 0.25 and less than or equal to 0.75 ($0.25 \leq z \leq 0.75$). For example, x may be any of the following numbers or in a range of any two of the numbers 0, 0.1, 0.3, 0.6, and 0.75; y may be any of the following numbers or in a range of any two of the numbers 0.05, 0.1, 0.15, 0.2, 0.25, 0.3, 0.35, 0.4 and 0.45; and z may be any of the following numbers or in a range of any two of the numbers 0.25, 0.3, 0.35, 0.4, 0.45, 0.5, 0.55, 0.6, 0.65, 0.7 and 0.75.

Figure 9:
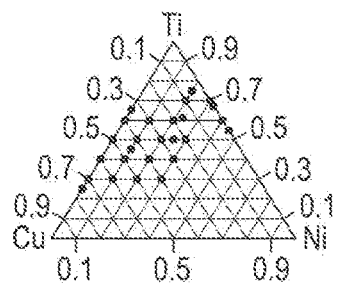
FIG. 9 is a ternary plot depicting alloys compositions including the elements of copper (Cu), nickel (Ni), and titanium (Ti).

For example, the composition represented by the formula $Cu_{0.05}Ni_{0.2}Ti_{0.75}$ may be used. Additional embodiments may use one or more of the following compositions $Cu_{0.1}Ni_{0.2}Ti_{0.7}$, $Cu_{0.2}Ni_{0.1}Ti_{0.7}$, $Cu_{0.3}Ni_{0.1}Ti_{0.6}$, $Cu_{0.4}Ni_{0.1}Ti_{0.5}$, $Cu_{0.5}Ni_{0.1}Ti_{0.4}$, and $Cu_{0.6}Ni_{0.1}Ti_{0.3}$. Additional embodiments may include one or more of the compositions represented in FIG. 9.

One or more compositions may have a greater copper (Cu) content and may exhibit improved thermal and/or electrical conductivity. For example, x may be greater than or equal to 0.35 and may have improved thermal and/or electrical conductivity. In one or more embodiments, x may be greater than or equal to 0.5 and have even greater thermal and/or electrical conductivity. In one or more embodiments, x may be greater than or equal to 0.65 and may have exceptional thermal and/or electrical conductivity. For example, x may be any of the following numbers or in a range of any two of the numbers 0.7, 0.71, 0.72, 0.73, 0.74, and 0.75.

One or more composition may have a greater nickel (Ni) content and may exhibit greater corrosion resistance. In or more embodiments, y may be greater than or equal to 0.25. Embodiments where y is greater than or equal to 0.35 may exhibit even greater corrosive resistant properties. For example, y may be any of the following numbers or in a range of any two of the numbers 0.35, 0.36, 0.37, 0.38, 0.39, 0.4, 0.41, 0.42, 0.43, 0.44 and 0.45.

One or more compositions may have a greater titanium (Ti) content and may exhibit reduced weights as compared with traditional steel materials. For example, some embodiments using the compositions similar to the composition represented by the formula $Cu_{0.05}Ni_{0.2}Ti_{0.75}$ have reduced weights. One or more compositions may have higher titanium content and may also have improved corrosion resistance. In one or more embodiments z may be greater than or equal to 0.5 and may exhibit improved corrosion resistance. In one or more embodiments z may be greater than or equal to 0.6 and may exhibit even greater corrosion resistance. In one or more embodiments z may be greater than or equal 0.7 and may exhibit exceptional corrosion resistance. For example, z may be any of the following numbers or in a range of any two of the numbers 0.70, 0.71, 0.72, 0.73, 0.74, and 0.75.

One or more compositions may have less titanium (Ti) content and may have reduced cost and/or improved processability. In one or more embodiments, z may be less than or equal to 0.5 and may exhibit reduced cost and/or improved workability. In one or more embodiments, z may be less than or equal to 0.25 and have further reduced cost and/or processability. For example, z may be any of the following numbers or in a range of any two of the numbers 0.25, 0.26, 0.27, 0.28, 0.29 and 0.3.

In one or more embodiments, an alloy including copper (Cu), nickel (Ni), and titanium (Ti) may be produced by mixing and melting high purity copper (Cu), nickel (Ni) and titanium (Ti) powders. In one or more embodiments, melting may be done under an argon (Ar) atmosphere. In one or more embodiments, a partially or fully amorphous alloy may be formed.

In one or more embodiments, an alloy suitable for bipolar plates may include aluminum (Al), iron (Fe), and silicon (Si). In one or more embodiments, the composition may be represented by the following formula:

$$Al_xFe_ySi_z \qquad (9)$$

where x is more than or equal to 0 and less than or equal to 0.885 ($0 \leq x \leq 0.885$); y is more than or equal to 0 and less than or equal to 0.85 ($0 \leq y \leq 0.85$); z is more than or equal to 0.05 and less than or equal to 0.8 ($0.05 \leq z \leq 0.8$), and $x+y+z=1$.

In one or more embodiments, x is more than or equal to 0.05 and less than or equal to 0.63 ($0.05 \leq x \leq 0.63$); y is more than or equal to 0.12 and less than or equal to 0.85 ($0.12 \leq y \leq 0.85$); and z is more than or equal to 0.1 and less than or equal to 0.25 ($0.1 \leq z \leq 0.25$). For example, x may be any of the following numbers or in a range of any two of the numbers 0, 0.05, 0.1, 0.15, 0.2, 0.25, 0.3, 0.35, 0.4, 0.45, 0.5, 0.55, 0.6 and 0.63; y may be any of the following numbers or in a range of any two of the numbers 0.12, 0.15, 0.20 and 0.25; and z may be any of the following numbers or in a range of any two of the numbers 0.1, 0.15, 0.2, 0.25, 0.3, 0.35, 0.4, 0.45, 0.5, 0.55, 0.6, 0.65, 0.7, 0.75, 0.8 and 0.85.

Figure 10:
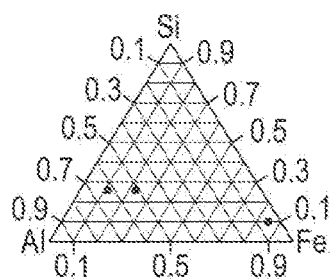
FIG. 10 is a ternary plot depicting alloys compositions including the elements of aluminum (Al), iron (Fe), and silicon (Si).

In one or more embodiments, the composition represented by the formula $Al_{0.52}Fe_{0.23}Si_{0.25}$ may be used. Additional embodiments may use one or more of the following compositions $Al_{0.05}Fe_{0.85}Si_{0.1}$, $Al_{0.063}Fe_{0.12}Si_{0.25}$, and $Al_{0.05}Fe_{0.85}Si_{0.1}$. Additional embodiments may include one or more of the compositions represented in FIG. 10.

One or more compositions may have a high aluminum (Al) content and may have reduced weights. For example, some embodiments using the composition $Al_{0.63}Cu_{0.12}Ti_{0.25}$ with a higher amount of aluminum may have a lower weight as compared to iron-based or steel materials. Other embodiments with compositions having a high aluminum content may also be lightweight materials suitable for bipolar plates.

In one or more embodiments, x may be greater than or equal to 0.3 and may have lighter weights. In one or more embodiments, x may be greater than or equal to 0.45 and may exhibit even lighter weights. In one or more embodiments x may be greater than or equal 0.55 and may exhibit considerably lower weights. For example, x may be any of the following numbers or in a range of any two of the numbers 0.55, 0.56, 0.57, 0.58, 0.59, 0.6, 0.61, 0.62 and 0.63 to achieve reduced weights.

One or more compositions may have higher iron (Fe) content and may exhibit reduced cost and properties more familiar to traditional materials. In one or more embodiments, y may be greater than or equal to 0.5 and exhibit properties consistent with more traditional processing techniques. Such embodiments may also exhibit reduced cost. In one or more embodiments, y may be greater than or equal to 0.75 and have further reduction in cost. For example, y may be any of the following numbers or in a range of any two of the numbers 0.75, 0.76, 0.77, 0.78, 0.79, 0.80, 0.81, 0.82, 0.83, 0.84, and 0.85.

One or more compositions may have greater silicon (Si) content and may also exhibit lower weights suitable for light weight applications. Embodiments with greater silicon may also exhibit improved corrosion resistance. In one or more embodiments, z may be greater than or equal to 0.17 and have improved corrosion resistance. For example, z may be any of the following numbers or in a range of any two of the numbers 0.17, 0.18, 0.19, 0.2, 0.21, 0.22. 0.23, 0.24 and 0.25 and may have a reduced weight and/or improved corrosion resistance.

In one or more embodiments, an alloy including aluminum (Al), iron (Fe), and silicon (Si) may be produced by mixing aluminum (Al), iron (Fe) and silicon (Si) powders and mechanically alloying. In one or more embodiments, iron and silicon powders may be mixed with aluminum metal.

In one or more embodiments, the iron (Fe) and silicon (Si) powders may be mixed. In one or more embodiments, the mixture may be mechanically alloyed. For example, the mixture may be ball milled. In one or more embodiments, the milling may occur at 200 rpm. In one or more embodiments, the powders may be alloyed for greater than or equal to 4 hours. In one or more embodiments, the milling may be carried out in an alcohol solution. In one or more embodiments, a steel container may be used. In one or more embodiments, the milling medium may be zirconia balls. In one or more embodiments, the weight of the milling medium may be 5 times the weight of the mixture. In one or more embodiments, the mixture may be dried in a rotary evaporator. In one or more embodiments, the drying may occur at 40° C. In one or more embodiments, drying may occur for 20 hours. In one or more embodiments, drying may occur in a negative pressure environment. In one or more embodiments, the negative pressure may be 5 Pa. In one or more embodiments, the particle size after milling may be about 37 to 155 μm. In one or more embodiments, the milled powder mixture may be wrapped by substantially pure aluminum (Al) strips to form a cored wire. In one or more embodiments, the aluminum strips may be greater than or equal to 99% pure. In one or more embodiments, the aluminum strips may be 12 mm×0.4 mm. In one or more embodiments, the wire may be drawn reducing the diameter to 2 mm. In one or more embodiments, a twin wire arc gun may be used. For example, the JZY-250 from Beijing Jiazhiyuan Scientific & Trading Co, Ltd. in China may be used. In one or more embodiments, a de Laval nozzle may be used. In one or more embodiments, the surface temperature of the sprayed material may be about 114° C. In one or more embodiments, a spraying voltage of about 34 volts may be used. In one or more embodiments, a spraying current of about 150 amps may be used. In one or more embodiments, compressed air pressure of about 700 kPa may be used. In one or more embodiments, a stand-off distance of about 200 mm may be used.

In one or more embodiments, an alloy suitable for bipolar plates may include aluminum (Al), manganese (Mn), and silicon (Si). In one or more embodiments, the composition may be represented by the following formula:

$$Al_xMn_ySi_z \qquad (10)$$

where x is more than or equal to 0 and less than or equal to 0.885 (0≤x≤0.885); y is more than or equal to 0 and less than or equal to 0.85 (0≤y≤0.85); z is more than or equal to 0.05 and less than or equal to 0.8 (0.05≤z≤0.8), and x+y+z=1.

In one or more embodiments, x is more than or equal to 0.45 and less than or equal to 0.66 (0.45≤x≤0.66); y is more than or equal to 0.1 and less than or equal to 0.2 (0.1≤y≤0.2); and z is more than or equal to 0.2 and less than or equal to 0.35 (0.2≤z≤0.35). For example, x may be any of the following numbers or in a range of any two of the numbers 0, 0.05, 0.1, 0.15, 0.2, 0.25, 0.3, 0.35, 0.4, 0.45, 0.5, and 0.55; y may be any of the following numbers or in a range of any two of the numbers 0.25, 0.3, 0.35, 0.4, 0.45, 0.5 0.55, 0.60, 0.65, 0.7, and 0.75; and z may be any of the following numbers or in a range of any two of the numbers 0.05, 0.1, 0.15, 0.2, 0.25, 0.3, 0.35, 0.4, 0.45, 0.5, 0.55, 0.6, and 0.65.

Figure 11:
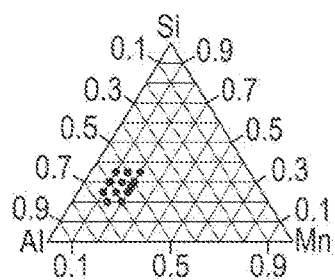
FIG. 11 is a ternary plot depicting alloys compositions including the elements of aluminum (Al), manganese (Mn), and silicon (Si).

For example, the composition represented by the formula $Al_{0.45}Mn_{0.2}Si_{0.35}$ may be used. Additional embodiments may use one or more of the following compositions $Al_{0.5}Mn_{0.15}Si_{0.35}$, $Al_{0.6}Mn_{0.1}Si_{0.3}$, and $Al_{0.66}Mn_{0.14}Si_{0.2}$. Additional embodiments may include one or more of the compositions represented in FIG. 11.

One or more compositions may have a higher aluminum (Al) content and may have lower weights as compared with typical bipolar plate materials such as steel. For example, some embodiments using the composition $Al_{0.6}Mn_{0.1}Si_{0.3}$ with a higher amount of aluminum have a lower weight as compared to an iron-based or steel materials. Other embodiments with compositions having a high aluminum content may also be lightweight materials suitable for bipolar plates. In one or more embodiments x may be greater than or equal to 0.55 and may have a reduced weight. In one or more embodiments x may be greater than or equal to 0.6 and may exhibit even lighter materials. For example, for light weight applications x may be any of the following numbers or in a range of any two of the numbers 0.55, 0.56, 0.57, 0.58, 0.59, 0.6, 0.61, 0.62, 0.63, 0.64, and 0.65.

One or more compositions may have greater manganese (Mn) and may have improved strength properties especially at high temperatures. In one or more embodiments y may be greater than or equal to 0.15 and improved strength may be achieved. For example, y may be any of the following numbers or in a range of any two of the numbers 0.15, 0.16, 0.17, 0.18, 0.19 and 0.20.

One or more compositions may have greater silicon content and may have improved corrosion resistance. Embodiments with greater silicon content may also have reduced weights. In one or more embodiments, z may be greater than or equal to 0.25 and may have greater corrosion resistance and/or reduced weights. In one or more embodiments, z may be greater than 0.3 and may have further improved corrosion resistance. For example, z may be any of the following numbers or in a range of any two of the numbers 0.3, 0.31, 0.32, 0.33, 0.34, and 0.35.

In one or more embodiments, an alloy including aluminum (Al), manganese (Mn), and silicon (Si) may be produced by mixing and heating aluminum (Al), manganese (Mn), and silicon (Si). In one or more embodiments, an amorphous structure may be obtained by a rapid quenching process.

In one or more embodiments, an alloy including aluminum (Al), manganese (Mn), and silicon (Si) may be produced by arc melting, melt spinning or a combination thereof. For example, arc melting substantially pure aluminum (Al), manganese (Mn) and silicon (Si) followed by melt spinning may be used. In one or more embodiments, the melt spinning may occur on the surface of a copper roller or wheel. In one or more embodiments, a roller with a 15 cm diameter may be used. In one or more embodiments, the roller may be spun at 6000 rpm. In one or more embodiments, the roller may have a surface velocity of about 60 m/s. In one or more embodiments, the melt may be housed in a quartz housing. In one or more embodiments the melt may be discharged through a 0.5 mm diameter orifice. In one or more embodiments, 40 to 100 kPa of argon gas may be used. In one or more embodiments the pressure may be optimized depending on the viscosity of the melt. In one or more embodiments, the pressure may be sufficient to produce a ribbon of about 10 μm thick by 1 mm wide. In one or more embodiments, the quench rate may be about 2,000,000 K/s. In one or more embodiments a fully or partially amorphous alloy may be formed.

In one or more embodiments, an alloy suitable for bipolar plates may include aluminum (Al), nickel (Ni), and silicon (Si). In one or more embodiments, the composition may be represented by the following formula:

$$Al_xNi_ySi_z \quad (11)$$

where x is more than or equal to 0 and less than or equal to 0.885 (0≤x≤0.885); y is more than or equal to 0 and less than or equal to 0.85 (0≤y≤0.85); z is more than or equal to 0.05 and less than or equal to 0.8 (0.05≤z≤0.8), and x+y+z=1.

In one or more embodiments, x is more than or equal to 0.52 and less than or equal to 0.79 (0.52≤x≤0.79); y is more than or equal to 0.04 and less than or equal to 0.23 (0.04≤y≤0.23); and z is more than or equal to 0.11 and less than or equal to 0.25 (0.11≤z≤0.25). For example, x may be any of the following numbers or in a range of any two of the numbers 0.52, 0.55, 0.6, 0.65, 0.7, 0.75, and 0.79; y may be any of the following numbers or in a range of any two of the numbers 0.04, 0.05, 0.1, 0.15, 0.2, and 0.23; and z may be any of the following numbers or in a range of any two of the numbers 0.11, 0.12, 0.13, 0.14, 0.15, 0.16, 0.17, 0.18, 0.19, 0.2, 0.21, 0.22, 0.23, 0.24 and 0.25.

Figure 12:
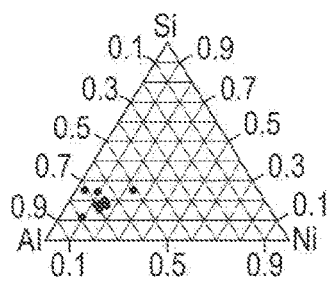
FIG. 12 is a ternary plot depicting alloys compositions including the elements of aluminum (Al), nickel (Ni), and silicon (Si).

In one or more embodiments, the composition represented by the formula $Al_{0.52}Ni_{0.23}Si_{0.25}$ may be used. Additional embodiments may use one or more of the following compositions $Al_{0.65}Ni_{0.15}Si_{0.2}$, $Al_{0.7}Ni_{0.15}Si_{0.15}$, and $Al_{0.79}Ni_{0.1}Si_{0.11}$. Additional embodiments may include one or more of the compositions represented in FIG. 12.

One or more compositions may have a higher aluminum (Al) content and may have reduced weights. For example, some embodiments using the composition $Al_{0.71}Ni_{0.04}Si_{0.25}$, with a higher amount of aluminum have a reduced weight as compared to an iron-based or steel materials. Other embodiments with compositions having a high aluminum content may also be lightweight materials suitable for bipolar plates. In one or more embodiments x may be greater than or equal to 0.65 and may exhibit reduced weights. In one or more embodiments, x may be greater than or equal to 0.7 and may exhibit even lower weights. For example, x may be any of the following numbers or in a range of any two of the numbers 0.7, 0.71, 0.72, 0.73, 0.74, 0.75, 0.76, 0.77, 0.78 and 0.79.

One or more compositions may have greater nickel (Ni) content and may exhibit improved hardness or strength. Higher nickel content may also reduce thermal expansion. In one or more embodiments, y may be greater than or equal to 0.14 and may exhibit improved hardness, strength and/or reduced expansive properties. For example, y may be any of the following numbers or in a range of any two of the numbers 0.14, 0.15, 0.16, 0.17, 0.18, 0.19, 0.2, 0.21, 0.22 and 0.23.

One or more compositions may have more silicon and may produce more corrosion resistant materials. Higher silicon content may also produce lighter weight materials. In one or more embodiments z may be more than or equal to 0.17 and may have improved corrosion resistance and/or reduced weights. For example, z may be any of the following numbers or in a range of any two of the numbers 0.17, 0.18, 0.19, 0.20, 0.21, 0.22, 0.23, 0.24, and 0.25.

In one or more embodiments, alloys including aluminum (Al), nickel (Ni), and silicon (Si) may be produced by arc melting high purity aluminum, nickel and silicon in an inert environment.

For example, aluminum (Al) with a purity of about 99.999 wt. %, nickel (Ni) with a purity of about 99.95 wt. % and silicon (Si) with a purity of about 99.999 wt. % may be used. In one or more embodiments, the elemental ingredients may be heated. In one or more embodiments, an inert environment may be used. In one or more embodiments, a helium atmosphere may be used. In one or more embodiments, free-flow chill-block melt spinning may be used. In one or more embodiments a grain refiner may be used. For example, a grain refiner may include but is not limited to titanium (Ti) and/or boron (B). In one or more embodiments, the melt may be heated to a temperature of about 900° C. (1173 K). In one or more embodiments, a RF induction coil may be used to heat. In one or more embodiments, the melt may be discharged onto a copper roll or wheel. In one or more embodiments, the copper wheel may have a surface velocity of 40 m/s. In one or more embodiments, the melt spinning may occur in a chamber with 20 kPa (200 mbar) of inert helium (He). In one or more embodiments, the melt spinning may produce a 3 mm wide by 30 μm thick ribbon.

In one or more embodiments, an alloy suitable for bipolar plates may include nickel (Ni), silicon (Si), and titanium (Ti). In one or more embodiments, the composition may be represented by the following formula:

$$Ni_xSi_yTi_z \quad (12)$$

where x is more than or equal to 0 and less than or equal to 0.885 (0≤x≤0.885); y is more than or equal to 0 and less than or equal to 0.85 (0≤y≤0.85); z is more than or equal to 0.05 and less than or equal to 0.8 (0.05≤z≤0.8), and x+y+z=1.

In another embodiment, x is more than or equal to 0 and less than or equal to 0.64 (0≤x≤0.64); y is more than or equal to 0 and less than or equal to 0.2 (0≤y≤0.2); and z is more than or equal to 0.16 and less than or equal to 0.8 (0.16≤z≤0.8). For example, x may be any of the following numbers or in a range of any two of the numbers 0, 0.05, 0.1, 0.15, 0.2, 0.25, 0.3, 0.35, 0.4, 0.45, 0.5, 0.55, 0.6 and 0.64; y may be any of the following numbers or in a range of any two of the numbers 0, 0.05, 0.1, 0.15 and 0.2; and z may be any of the following numbers or in a range of any two of the numbers 0.16, 0.2, 0.25, 0.3, 0.35, 0.4, 0.45, 0.5, 0.55, 0.6, 0.65, 0.7, 0.75 and 0.8.

Figure 13:
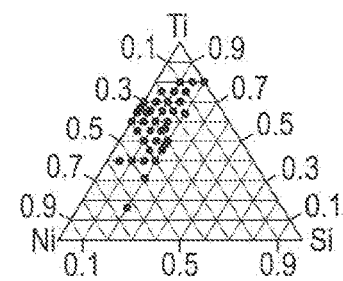
FIG. 13 is a ternary plot depicting alloys compositions including the elements of nickel (Ni), silicon (Si) and titanium (Ti).

For example, the composition represented by the formula $Ni_{0.1}Si_{0.1}Ti_{0.8}$ may be used. Additional embodiments may use one or more of the following compositions $Ni_{0.2}Si_{0.1}Ti_{0.7}$, $Ni_{0.3}Si_{0.1}Ti_{0.6}$, $Ni_{0.4}Si_{0.1}Ti_{0.5}$, and $Ni_{0.5}Si_{0.1}Ti_{0.4}$. Additional embodiment may include one or more of the compositions represented in FIG. 13.

One or more compositions may have a greater nickel (Ni) content and may exhibit improved hardness or strength. Higher nickel content may also reduce thermal expansion. In one or more embodiments, x may be greater than or equal to 0.3 and have improved hardness, strength and/or reduced expansive properties. For example, y may be any of the following numbers or in a range of any two of the numbers 0.3, 0.35, 0.4, 0.45, 0.50, 0.55, 0.6, and 0.64.

One or more compositions may have a higher silicon content and may exhibit improved corrosion resistance. In one or more embodiments, y may be greater than or equal to 0.1 and have improved corrosion resistance. For example, y may be any of the following numbers or in a range of any two of the numbers 0.1, 0.11, 0.12, 0.13, 0.14, 0.15, 0.16, 0.17, 0.18, 0.19, and 0.2.

One or more compositions may have a higher silicon and/or titanium content and may produce materials with lighter weights. In one or more embodiments, a material represented by the formula $Ni_0Si_{0.2}Ti_{0.8}$ may be used for light weight applications. In one or more embodiments, y may be greater than or equal to 0.1 and may exhibit lower weights. Likewise, in one or more embodiments z may be greater than or equal to 0.5 and lower weights may be obtained. In one or more embodiments, z may be greater than or equal to 0.6 and have further reduced weights. In one or more embodiments, z may be greater than or equal to 0.7 and have considerably lower weights. For example, z may be any of the following numbers or in a range of any two of the numbers 0.7, 0.71, 0.72, 0.73, 0.74, 0.75, 0.76, 0.77, 0.78, 0.79 and 0.80.

In one or more embodiments, an alloy including nickel (Ni), silicon (Si), and titanium (Ti) may be produced by mixing and heating high purity nickel, silicon and titanium. For example, in one or more embodiments, the mixture may be heated to greater than or equal to 1500 K. In one or more embodiments, a heated mixture may be injected into a mold. In one or more embodiments, a high-pressure nozzle may be used to inject a heated material into a mold. In one or more embodiments, a mold may be used to form a bipolar plate. In one or more embodiments, small amounts or impurities such as zirconium (Zr) may improve glass forming ability.

For example, a copper mold casting method may be used. In one or more embodiments, the elemental components may be arc-melted. In one or more embodiments, the elemental components may be melted under an inert environment. In one or more embodiments, an argon atmosphere may be used as an inert environment. In one or more embodiments, a purity of about 99.8% to 99.99% may be used. In one or more embodiments, re-melting may occur. In one or more embodiments, re-melting may occur greater than or equal to 4 times. In one or more embodiments, elemental components may be inductively melted. In one or more embodiments, a fused silica housing may be used to hold the melt. In one or more embodiments, the melt may be quenched on a copper roll or wheel. In one or more embodiments the surface velocity of the wheel may be about 30 m/s. In one or more embodiments, a ribbon about 3 to 4 mm wide and about 30 μm thick may be formed. In one or more embodiments, a rod-shaped bulk material may be obtained. In one or more embodiments, an injection melting method may be used. In one or more embodiments, copper molds may be used. In one or more embodiments, the molds may facilitate cooling liquids such as water. In one or more embodiments, up to 20 at. % zirconium (Zr) may be used.

In one or more embodiments, an alloy suitable for bipolar plates may include carbon (C), iron (Fe), and silicon (Si). In one or more embodiments, the composition may be represented by the following formula:

$$C_xFe_ySi_z \qquad (13)$$

where x is more than or equal to 0 and less than or equal to 0.885 ($0 \leq x \leq 0.885$); y is more than or equal to 0 and less than or equal to 0.85 ($0 \leq y \leq 0.85$); z is more than or equal to 0.05 and less than or equal to 0.8 ($0.05 \leq z \leq 0.8$), and $x+y+z=1$.

In one or more embodiment, x is more than or equal to 0.1 and less than or equal to 0.25 ($0.1 \leq x \leq 0.25$); y is more than or equal to 0.65 and less than or equal to 0.7 ($0.65 \leq y \leq 0.7$); and z is more than or equal to 0.1 and less than or equal to 0.25 ($0.1 \leq z \leq 0.25$). For example, x may be any of the following numbers or in a range of any two of the numbers 0.1, 0.15, 0.2 and 0.25; y may be any of the following numbers or in a range of any two of the numbers 0.65, 0.66, 0.67, 0.68, 0.69 and 0.7; and z may be any of the following numbers or in a range of any two of the numbers 0.1, 0.15, 0.2 and 0.25.

Figure 14:
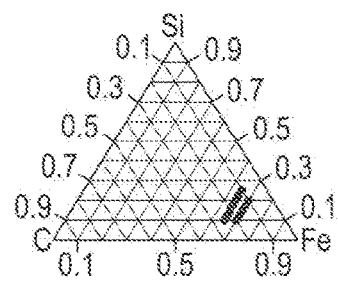
FIG. 14 is a ternary plot depicting alloys compositions including the elements of carbon (C), iron (Fe), and silicon (Si).

In one or more embodiments the composition represented by the formula $C_{0.1}Fe_{0.65}Si_{0.25}$ may be used. Additional embodiments may use one or more of the following compositions $C_{0.15}Fe_{0.65}Si_{0.2}$, $C_{0.2}Fe_{0.7}Si_{0.1}$, and $C_{0.25}Fe_{0.65}Si_{0.1}$. Additional embodiments may include one or more of the compositions represented in FIG. 14.

One or more compositions may have greater amounts of carbon (C) and/or silicon (Si) and may exhibit reduced weights compared to more traditional iron-based steel. For example, some embodiments using the composition $C_{0.25}Fe_{0.65}Si_{0.1}$ may have reduced weights. Greater amounts of carbon and/or silicon may also improve corrosion resistance. In one or more embodiments, x may be greater than or equal to 0.15 and have a reduced weight and/or improved corrosion resistance. In one or more embodiments, z may be greater than or equal to 0.15 and have improved corrosion resistance and/or reduced weights. For example, x may be any of the following numbers or in a range of any two of the numbers 0.15, 0.16, 0.17, 0.18, 0.19, 0.2, 0.21, 0.22, 0.23, 0.24 and 0.25. In one or more embodiments, z may be any of the following numbers or in a range of any two of the numbers 0.15, 0.16, 0.17, 0.18, 0.19, 0.2, 0.21, 0.22, 0.23, 0.24 and 0.25.

One or more compositions may have greater iron (Fe) content and may have reduced cost and/or improved strength. For example, y may be any of the following numbers or in a range of any two of the numbers 0.68, 0.69, and 0.7.

One or more compositions may have increased silicon (Si) and may have reduced cost. In one or more embodiments, z may be greater than or equal to 0.15 and have reduced cost. For example, z may be any of the following numbers or in a range of any two of the numbers 0.15, 0.16, 0.17, 0.18, 0.19, 0.2, 0.21, 0.22, 0.23, 0.24, and 0.25.

In one or more embodiments, an alloy including carbon (C), iron (Fe), and silicon (Si) may be produced by induction heating the elemental components. In one or more embodiments melt spinning may be used. In one or more embodiments, a ribbon with a thickness of 20 μm may be formed. In one or more embodiments, cylindrical bulk alloys may be obtained by copper mold casting. In one or more embodiments, less than about 1 at. % of boron (B) may be added or exist as an impurity to improve glass forming ability. In one or more embodiments, less than or equal to about 20 at. % of zirconium (Zr) may be added. In one or more embodiments, a partially or fully amorphous alloy may be obtained.

In one or more embodiments, an alloy with a composition represented by the formula:

$$Al_xM_yN_z \qquad (14)$$

where M is selected from the group consisting of copper (Cu), iron (Fe), manganese (Mn), and nickel (Ni); N is selected from the group consisting of Ti, Ni, and Si; x is more than or equal to 0 and less than or equal to 0.885 (0≤x≤0.885); y is more than or equal to 0 and less than or equal to 0.85 (0≤y≤0.85); z is more than or equal to 0.05 and less than or equal to 0.8 (0.05≤z≤0.8), and x+y+z=1 may be suitable for bipolar plates.

In one or more embodiments, an alloy with a composition represented by the formula:

$$Cu_xM_yTi_z \qquad (15)$$

where M is selected from the group consisting of iron (Fe) and nickel (Ni); x is more than or equal to 0 and less than or equal to 0 and less than or equal to 0.885 (0≤x≤0.885); y is more than or equal to 0 and less than or equal to 0.85 (0≤y≤0.85); z is more than or equal to 0.05 and less than or equal to 0.8 (0.05≤z≤0.8), and x+y+z=1 may be suitable for bipolar plates.

In various embodiments, one or more of the elements including lanthanum (La), phosphorous (P), boron (B), carbon (C), cobalt (Co), zirconium (Zr), chromium (Cr), niobium (Nb), molybdenum (Mo), tungsten (W), and tin (Sn) may be added to any of the alloys described herein to improve glass forming ability. Alternatively, these materials may exist as impurities. Additions may also occur with one or more of the elements nitrogen (N), carbon (C), fluorine (F), and/or any other elements of the periodic table to modify mechanical strength, ductility, electronic or thermal conductivity, hydrophobicity, and/or corrosion resistance. The elements identified above are meant to be exemplary and are not an exhaustive list. Any other chemical, known to one skilled in the art may be used to modify the properties of any of the alloys discussed herein. In one or more embodiments, one or more of these additions may occur at up to about 20 at. %. For example, boron (B) may be present at about 1.7 at. %. In one or more embodiments, carbon may be added at about 6, 9, 12 or 15 at. %. Most preferably, doping at less than or equal to 1 at. % may be desirable for reduced cost.

In one or more embodiments, doping, a dopant, or a doping agent refers to a small amount of one or more additional elements. A dopant may be intentionally added or exist as an impurity. In one or more embodiments, a dopant may be present at concentrations of less than or equal to 1 at. %. In one or more embodiments, copper (Cu) may be present at 0.3 at. %. In one or more embodiments, a dopant may be present at concentrations of less than or equal to 5 at. %. In still other embodiments, a dopant may be present at concentrations of less than or equal to 15 at. %. For example, zirconium (Zr) may be present at 11 at. %.

In one or more embodiments where a dopant is present, the ratio between the 3 elements as expressed by x, y, and z should be maintained, although the elements represented by x, y, and z clearly will not account for 100% of the total composition including the dopant.

As discussed herein alloys may be used as a surface layer coating 310 over more traditional bipolar plate materials. For example, the substrate 304 of the bipolar plate 302 may be made of steel, another metal alloy containing but not limited to titanium (Ti), nickel (Ni), aluminum (Al), or copper (Cu) or any other material known to one skilled in the art. In one or more embodiments, the surface layer coating 310 may include one or more of the alloys described herein. The surface layer coating 310 may be chemically or physically deposited on the substrate 304. In one or more embodiments, the surface layer coating 310 may be applied to a substrate 304 by using a high-velocity oxy-fuel spraying method. In one or more embodiments, a chemical, physical or laser-based deposition method may be used. In one or more embodiments, heat treatments may be used. In one or more embodiments, the surface layer coating 310 may be quenched. In one or more embodiments, the surface layer coating 310 may be partially or fully amorphous.

In one or more embodiments, a bipolar plate may be made of an alloy and may exhibit a corrosion current of less than 1 μA/cm². In one or more embodiments, the corrosion current may be determined in a 60 to 80° C. solution when the pH is in the range of 1 to 4 and with a presence of 0.1 ppm HF. In one or more embodiments, bipolar plates made of an alloy may have a corrosion resistance of 10 μA/cm². In one or more embodiments, the bipolar plate may be formed of a substrate 304 with a surface layer coating including one or more alloys described herein. In one or more embodiments, the substrate 304 may have a corrosion current greater than the corrosion current of the surface layer coating 310. In one or more embodiments, the corrosion potential of the surface layer coating 310 may be greater than the corrosion potential of the substrate 304. In one or more embodiments, the surface layer coating may have a corrosion current less than 1 μA/cm². In one or more embodiments, the surface layer coating may have a corrosion current less than 10 μA/cm². In one or more embodiments, the electrical conductivity of bipolar plates formed with an alloy may be greater than 100 S/cm. In one or more embodiments, the electrical conductivity may be from 0.1 to 100 S/cm. In one or more embodiments, the surface layer coating 310 may have a greater electrical conductivity than the substrate 304. In one or more embodiments, the surface layer coating 310 may have an electrical conductivity greater than 100 S/cm. In one or more embodiments, the surface layer coating 310 may have an electrical conductivity from 0.1 to 100 S/cm. In one or more embodiments, an alloy may be applied to a substrate to obtain these or similar properties. In one or more embodiments, the surface layer coating 310 thickness may be optimized to achieve a conductivity greater than 100 S/cm. The optimized thickness may be from about 1 nm to 500 μm. In one or more embodiments, the thickness may be 1 nm to 999 nm. In one or more embodiments, the thickness may be 50 nm to 500 nm. In one or more embodiments, the thickness may be 100 nm to 250 nm. In one or more embodiments, a thinner surface layer coating 310 may reduced cost. In one or more embodiments, the electrical conductivity may be from about 0.1 to 100 S/cm. In one or more embodiments, the thickness may be optimized to achieve an electrical conductivity from about 0.1 to 100 S/cm. In one or more embodiments, the interfacial contact resistance between the substrate 304 and the surface layer coating 310 may be less than 0.01 Ohms/cm². In one or more embodiments, the interfacial contact resistance between the substrate 304 and the surface layer coating 310 may be less than 0.1 Ohms/cm². One or more of the alloys, as discussed herein, may be suitable for formation of a bipolar plate or as a surface layer coating 310 on a substrate 304. In one or more embodiments, the alloys described herein may be used in combination with other alloys including the alloys described herein.

In one or more embodiments, the alloy may be fully amorphous. In one or more embodiments, the alloy may be partially amorphous. In one or more embodiments, the alloy may display short-range, medium-range or long-range order between constituents. In one or more embodiments, the alloy may be partially crystalline. The processing conditions may be modified as known and understood to one skilled in the art to modify the degree of crystallinity. For example, a solid-state method such as ball-milling may be used. In one or more embodiments, an arc melting process combined with a quenching method may be used. In one or more embodiments, the degree of amorphous structure or crystalline structure may be determined by a using XRD methods. In one or more embodiments, XRD may be achieved with Cu Kα radiation. In one or more embodiments, the degree of amorphous structure or crystalline structure may be determined by transmission electron microscopy (TEM) analysis. Reference to an amorphous state, even a complete or fully amorphous state, may still have nanocrystals of minimal size. In one or more embodiments, the nanocrystals may have a maximum dimension of only a few nanometers. For example, the nanocrystals may have a maximum dimension from about 15 to 33 nm. In one or more embodiments, short or medium-range order regions may exist. One of ordinary skill in the art would understand that some techniques may not detect or measure such regions or nanocrystals.

In one or more embodiments, as described herein, an element in an alloy may be described has having favorable or unfavorable effect as a result of increasing or decreasing that specific element. A person of ordinary skill in the art would understand that per the described formula where x+y+z=1, one or more of the other elements would need to be correspondingly increased or decreased.

In one or more embodiments, the average chemical composition of the glassy powder particles may be ±1 at. % from the intended proportions. For example, if about 1753.80 grams of aluminum powder, 2541.84 grams of copper powder and 239.34 grams of titanium powder are mixed and mechanically alloyed, the glassy particles may have an average chemical composition of 65 at. %±1 at. % aluminum, 40 at. %±1 at. % copper, and 5 at. %±1 at. % titanium. In one or more embodiments, an average chemical composition of 65 at. %±1.5 at. % aluminum, 40 at. %±1.5 at. % copper, and 5 at. %±1.5 at. % titanium may be suitable. In one or more embodiments, an average chemical composition of 65 at. %±5 at. % aluminum, 40 at. %±5 at. % copper, and 5 at. %±5 at. % titanium may be suitable. In one or more embodiments, mechanically alloying powders such as by ball milling may be carried out until the glassy powder particles have a nearly equiaxed morphology and a narrow particle size distribution. For example, this may be 30 hours. In one or more embodiments, the mechanical alloying may be stopped after particle size and particle size distribution remain substantially unchanged. In one or more embodiments mechanical alloying may be complete if the particle size and/or particle size distribution does not change by more than 1% after 1.5 hours. In another embodiment, mechanical alloying may be complete if the particle size and/or particle size distribution does not change by more than 5% after 1 hour. In another embodiment, mechanical alloying may be completed if the particle size and/or particle size distribution does not change by more than 10% after 30 minutes.

In one or more embodiments, mechanical alloying may be discontinued before particle size distributions and particle size remain substantially unchanged. In one or more embodiments, mechanical alloying may be discontinued before equiaxed morphologies are obtained. In one or more embodiments, where mechanical alloying is discontinued before completion a partially amorphous or partially crystalline structure may be obtained.

Morphologies may be determined using a scanning electron microscopy (SEM) with an EDX analyzer. A VEGA-TESCAN model SEM may be used. In one or more embodiments, morphologies may be determined by XRD and/or DTA. In one or more embodiments, a Reometric STA 1500 analyzer may be used. In one or more embodiments, the morphology of the particles may be but is not limited to flakes, plates, chips, particles, and powder. In one or more embodiments, the shape or morphology of these particles may be irregular.

In one or more embodiments, chemical alloying may be used. In one or more embodiments, atomization techniques may be used. In one or more embodiments, an alloy may be applied by compression bonding, plating, or vapor deposition. For example, a physical vapor deposition technique such as sputtering may be used. In one or more embodiments, an alloy may be applied by thermal spraying techniques.

In one or more embodiments, partially or fully amorphous alloys may also be formed by rapid solidification techniques. In one or more embodiments, melt spinning may be a technique for rapid solidification to form an alloy. Rapid solidification may also be achieved by thermal spraying techniques.

In one or more embodiments, thermal spraying techniques may achieve a solidification rate of about 100,000 to 100,000,000 K/s. In one or more embodiments, thermal spraying techniques may include plasma spraying. In one or more embodiments, thermal spraying may include flame thermal spraying. In one or more embodiments, thermal spraying techniques may include high velocity oxygen fuel spraying. In one or more embodiments, the fuel may be selected from the group consisting of kerosene, acetylene, hydrogen, propane, propylene or any other fuel known to one of skill in the art. In one or more embodiments, thermal spraying techniques may include pulsed thermal spraying.

In one or more embodiments involving a rapid heating process, only a portion of the underlying material or particle may be melted or converted to a liquid state. For example, it is possible that only the outer surface or outer surface portion of a particle to melted or converted to a liquid state. In one or more embodiments, thermal spraying may involve a rapid heating process.

In one or more embodiments, cold gas dynamic spraying may be used. In one or more embodiments, arc spraying may be used. In one or more embodiments, a partially or fully amorphous alloy may be formed by quenching or rapid quenching techniques. In one or more embodiments, heat treatments may be applied to obtain the desired amorphous or crystalline characteristics. Heat treatments may also be used to modify ductility, hardness, or workability.

In one or more embodiments, a press may be used. In one or more embodiments the press may include a die. In one or more embodiments, a hot press may be used.

In one or more embodiments, techniques such DTA may be used to determine the thermal stability of an alloy. Thermal stability may also be analyzed with DSC.

In one or more embodiments, processing may be below the first crystallization onset temperature ($T_x$) to ensure an amorphous or partially amorphous structure is maintained. For example, the first crystallization onset temperature ($T_x$) may be about 890° C. and processing may be below 890° C.

In one or more embodiments, the first crystallization onset temperature ($T_x$) may be greater than 890° C. In one or more embodiments, the first crystallization onset temperature ($T_x$) may be less than 890° C. For example, the first crystallization onset temperature ($T_x$) may be about 780° C. In one or more embodiments, the first crystallization onset temperature ($T_x$) may be about 402° C. In one or more embodiments, the first crystallization onset temperature ($T_x$) may be about 359° C. In still other embodiments, the first crystallization temperature ($T_x$) may be greater than or equal to about 326° C. In one or more embodiments, the first crystallization onset temperature may be 147° C. to 164° C. Various and diverse crystallization onset temperatures ($T_x$) may exist as there are various and diverse combination disclosed herein. In one or more embodiments, processing may occur above the first crystalline onset temperature ($T_x$). In one or more embodiments, an alloy heated above the first onset crystalline onset temperature may be partially crystalline. In one or more embodiments, an alloy may be heated above the first crystalline onset temperature ($T_x$) and this may be combined with quenching, rapid solidification or controlled cooling techniques.

In one or more embodiments, an inert environment may be used. In one or more embodiments, an inert environment may be formed by using an inert atmosphere. In one or more embodiments, substantially pure or pure argon may be used at 99.997 vol. %. In one or more embodiments, helium may be used.

The various combinations described above are not limiting. The processing condition and parameters described herein, are not limited to any particular embodiment and may be combined with other embodiments to employ alloys in the formation of a bipolar plate and/or surface layer coating of a bipolar plate. Further, the benefits and/or disadvantages discussed are not exclusive to any one embodiment and may represent similar benefits or disadvantages in another embodiment. For example, if an embodiment describes using a helium atmosphere, this does not mean that a helium atmosphere is exclusive to the embodiment described herein. Likewise, if an embodiment describes greater nickel content as improving thermal expansion, it should be understood that this property is not exclusive to the embodiment discussed herein and that greater nickel content in other embodiments may improve thermal expansion.

While exemplary embodiments are described above, it is not intended that these embodiments describe all possible forms encompassed by the claims. The words used in the specification are words of description rather than limitation, and it is understood that various changes can be made without departing from the scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A bipolar plate of a fuel cell, the bipolar plate comprising:
    a substrate having first and second surfaces; and
    a surface layer coating on at least one of the first and/or second surfaces, the surface layer coating including an alloy having at least a partially amorphous structure and a formula: $Al_xFe_ySi_z$, $Al_xMn_ySi_z$, or $Al_xNi_ySi_z$; where x is present up to 0.885; y is present up to 0.85; z is 0.05 to 0.8; and the sum of x, y, and z is 1.

2. The bipolar plate of claim 1, wherein the alloy has a corrosion current that is less than the corrosion current of the substrate.

3. The bipolar plate of claim 1, wherein the alloy has a corrosion current that is less than 10 $\mu A/cm^2$.

4. The bipolar plate of claim 1, wherein the alloy has the formula:
    $Al_xFe_ySi_z$; where x is 0.05 to 0.63; y is 0.12 to 0.85; and z is 0.1 to 0.25.

5. The bipolar plate of claim 1, wherein the alloy has the formula:
    $Al_xMn_ySi_z$; where x is 0.45 to 0.66; y is 0.1 to 0.2; and z is 0.2 to 0.35.

6. The bipolar plate of claim 1, wherein the alloy has the formula:
    $Al_xNi_ySi_z$; where x is 0.52 to 0.79; y is 0.04 to 0.23; and z is 0.11 to 0.25.

7. The bipolar plate of claim 1, wherein the alloy is doped with less than or equal to 1 at. % of an element selected from the group consisting of La, P, B, C, Co, Zr, Cr, Nb, Mo, W, Sn, and a combination thereof.

8. The bipolar plate of claim 1, wherein the surface coating layer has a thickness of 1 nm to 500 µm.

9. A bipolar plate of a fuel cell, the bipolar plate comprising:
    an alloy having at least a partially amorphous structure and a formula: $Al_xMn_ySi_z$, or $Al_xNi_ySi_z$; where x is present up 0.885; y is present up 0.85; z is 0.05 to 0.8 and the sum of x, y, and z is 1.

10. The bipolar plate of claim 9, wherein the formula is $Al_xMn_ySi_z$ where x is 0.45 to 0.66, y is 0.1 to 0.2, z is 0.2 to 0.35; or $Al_xNi_ySi_z$ where x is 0.52 to 0.79, y is 0.1 to 0.23, and z is 0.11 to 0.25.

11. A fuel cell comprising:
    a proton exchange membrane;
    a plurality of catalyst electrode layers; and
    bipolar plates including an alloy having at least a partially amorphous structure and a formula: $Al_xMn_ySi_z$, or $Al_xNi_ySi_z$ where x is present up to 0.885; y is present up to 0.85; z is 0.05 to 0.8 and the sum of x, y, and z is 1.

* * * * *